(12) United States Patent
Yang et al.

(10) Patent No.: US 10,122,498 B2
(45) Date of Patent: Nov. 6, 2018

(54) COMMUNICATION METHOD, APPARATUS AND SYSTEM FOR MULTIPLE ACCESS POINTS

(71) Applicant: Huawei Technologies Co., Ltd., Shenzhen (CN)

(72) Inventors: Xun Yang, Shenzhen (CN); Yi Luo, Shenzhen (CN); Jing Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 15/012,561

(22) Filed: Feb. 1, 2016

(65) Prior Publication Data

US 2016/0149671 A1 May 26, 2016

Related U.S. Application Data

(63) Continuation of application No. PCT/CN2013/080751, filed on Aug. 2, 2013.

(51) Int. Cl.
*H04L 1/16* (2006.01)
*H04L 29/08* (2006.01)
(Continued)

(52) U.S. Cl.
CPC ......... *H04L 1/1621* (2013.01); *H04B 7/0452* (2013.01); *H04L 1/1685* (2013.01);
(Continued)

(58) Field of Classification Search
None
See application file for complete search history.

(56) References Cited

U.S. PATENT DOCUMENTS

| | | | |
|---|---|---|---|
| 2006/0034247 A1 | 2/2006 | Gu et al. | |
| 2006/0104300 A1 | 5/2006 | Ho | |

(Continued)

FOREIGN PATENT DOCUMENTS

| | | |
|---|---|---|
| CN | 1943157 A | 4/2007 |
| CN | 101399643 A | 4/2009 |

(Continued)

*Primary Examiner* — Jason E Mattis
*Assistant Examiner* — Hong Shao
(74) *Attorney, Agent, or Firm* — Leydig, Voit & Mayer, Ltd.

(57) ABSTRACT

Embodiments of the present invention provide a communication method, apparatus and system for multiple access points. The method includes: simultaneously sending, by a primary sending terminal and a secondary sending terminal, data corresponding to each receiving terminal to each receiving terminal through a shared channel; sending, by the primary sending terminal, BAR corresponding to the data to each receiving terminal; receiving, by the primary sending terminal, BA corresponding to the BAR and sent by each receiving terminal; and if the BA indicates that the data are correctly received by each receiving terminal, clearing the data cached in the primary sending terminal, and if the BA indicates that the data is not correctly received by each receiving terminal, retransmitting data which is not correctly received, and clearing correctly received data cached in the primary sending terminal.

13 Claims, 10 Drawing Sheets

(51) Int. Cl.
*H04B 7/04* (2017.01)
*H04B 7/0452* (2017.01)
*H04L 1/00* (2006.01)

(52) U.S. Cl.
CPC .. *H04L 67/2852* (2013.01); *H04L 2001/0092* (2013.01); *H04L 2001/0093* (2013.01)

(56) References Cited

U.S. PATENT DOCUMENTS

2009/0307557 A1* 12/2009 Rao ................ H04L 1/1874
    714/749
2011/0268094 A1* 11/2011 Gong ............... H04L 1/1685
    370/338

FOREIGN PATENT DOCUMENTS

| CN | 102843221 A | 12/2012 |
|----|-------------|---------|
| CN | 103095429 A | 5/2013  |

* cited by examiner

| MAC address | BA control | BA information | sequence of sending terminals | forward error correction operator |

| | BSS 1 | | | BSS n | |
|---|---|---|---|---|---|
| sending terminal 1 | receiving terminal 1 | ... | receiving terminal k | ... | |

| MAC address | BAR control | BAR information | sequence of sending terminals | forward error correction operator |

COMMUNICATION METHOD, APPARATUS AND SYSTEM FOR MULTIPLE ACCESS POINTS

CROSS-REFERENCE TO RELATED APPLICATIONS

This application is a continuation of International Patent Application No. PCT/CN2013/080751, filed on Aug. 2, 2013, which is hereby incorporated by reference in its entirety.

TECHNICAL FIELD

The present invention relates to a field of communication, and particularly, to a communication method, apparatus and system for multiple access points.

BACKGROUND

In a wireless communication system, multiple input multiple output (MIMO) refers to construction of multidimensional space resources by using multiple antennas. Multiple parallel paths are formed by these multidimensional space resources. Thus, a wireless station in the system may use these parallel paths to transmit multiple paths of signals to improve a rate of data transmission. Generally, it is called downlink multiuser multiple input multiple output (DL MU-MIMO) for a manner that one wireless station configured with a larger antenna number distinguishes users and transmits data to multiple wireless stations configured with smaller antenna numbers using space resource, and it is called uplink multiuser multiple input multiple output (UL MU-MIMO) for a manner that multiple wireless stations configured with smaller antenna numbers distinguish users and transmit data to one wireless station configured with a larger antenna number using space resource.

In the prior art, in a wireless communication system which obtains a channel based on a way of competition, in order to guarantee the reliability of data transmission, in DL MU-MIMO, a sending terminal, after data is sent, needs to inquire a condition of data receiving of each receiving terminal one by one according to a certain time sequence, since multiple receiving terminals are provided. After the each receiving terminal receives the inquiry, the receiving terminal returns, if data are correctly received, information about the data is correctly received to the sending terminal. In UL MU-MIMO, after multiple sending terminals simultaneously send data to a receiving terminal, the receiving terminal returns, if the data are correctly received, information about the data is correctly received to the each sending terminal one by one according to a certain time sequence, or the receiving terminal only returns one piece of information about the data is correctly received. However, in this information, each receiving terminal needs to be instructed respectively.

However, the above-mentioned two scenarios merely support error recovery (retransmitting data which is not correctly received by a receiving terminal) for data transmissions between one sending terminal and multiple receiving terminals in DL MU-MIMO and between multiple sending terminals and one receiving terminal in UL MU-MIMO respectively. However, error recovery for transmitting data simultaneously between multiple sending terminals and multiple receiving terminals is not supported. Thus, for a system transmitting data between multiple sending terminals and multiple receiving terminals simultaneously, reliability of the data transmission cannot be guaranteed.

SUMMARY

An embodiment of the present invention provide a communication method, apparatus and system for multiple access points, which can support error recovery when multiple sending terminals and multiple receiving terminals transmit data simultaneously, so as to guarantee reliability of data transmission and improve throughput of system.

To achieve an above-mentioned objective, an embodiment of the present invention adopts a following technical solution.

In a first aspect, an embodiment of the present invention provide a communication system, including a primary sending terminal, at least one secondary sending terminal sharing a channel with the primary sending terminal and at least one receiving terminal, wherein, the primary sending terminal is configured to:

respectively send data corresponding to the each receiving terminal to the each receiving terminal;

respectively send a block acknowledgement request BAR corresponding to the data to the each receiving terminal;

receive a block acknowledgement BA corresponding to the BAR and sent by the each receiving terminal respectively; and if the BA indicates that the data are correctly received by the each receiving terminal, clear the data cached in the primary sending terminal, and if the BA indicates that the data are not correctly received by the each receiving terminal, retransmit the data which are not correctly received, and clear correctly received data cached in the primary sending terminal;

the secondary sending terminal is configured to:

simultaneously send the data to the each receiving terminal with the primary sending terminal through a shared channel; and the receiving terminal is configured to:

receive the data sent by the primary sending terminal and the secondary sending terminal;

receive the BAR corresponding to the data and sent by the primary sending terminal; and send the BA corresponding to the BAR to the primary sending terminal.

In a first possible implementation manner of the first aspect, the secondary sending terminal is further configured to:

obtain the BA sent by the each receiving terminal through the shared channel respectively; and if the BA indicates that the data are correctly received by the each receiving terminal respectively, clear the data cached in the secondary sending terminal, or if the BA indicates that the data are not correctly received by the each receiving terminal, simultaneously retransmit data which are not correctly received with the primary sending terminal through the shared channel respectively, and clear correctly received data cached in the secondary sending terminal.

In combination with the foregoing first aspect or the first possible implementation manner of the first aspect, in a second possible implementation manner, after respectively sending the BAR corresponding to the data to the each receiving terminal, the primary sending terminal is further configured to resend, if not receiving the BA corresponding to the BAR after a preset time, the BAR to each receiving terminal which does not sends back the BA.

In combination with the foregoing first aspect or the first possible implementation manner of the first aspect, in a third possible implementation manner, after receiving the BA sent by the each receiving terminal respectively, the primary sending terminal is further configured to send, if the BA indicates that the data are not correctly received by the each receiving terminal, a data indication to the each receiving terminal not correctly receiving the data, wherein the data indication is used for indicating data which are not correctly received by the each receiving terminal.

In combination with the foregoing first aspect or any implementation manner from the first possible implementation manner to the third possible implementation manner of the first aspect, in a fourth possible implementation manner, there are more than two receiving terminals, the primary sending terminal is specifically configured to respectively send the BAR to the each receiving terminal according to a preset sequence, wherein the preset sequence is that sending the BAR to each receiving terminal belonging to a same basic service set BSS as the primary sending terminal at first and then sending the BAR to each receiving terminal not belonging to the same BSS as the primary sending terminal.

In combination with the foregoing first aspect or any implementation manner from the first possible implementation manner to the fourth possible implementation manner of the first aspect, in a fifth possible implementation manner, the primary sending terminal is specifically configured to:

obtain a first indication according to the BA, wherein the first indication is used for indicating the data correctly received by the each receiving terminal, which is obtained by the primary sending terminal; and clear, according to the first indication, the data corresponding to the first indication, which is cached in the primary sending terminal.

In combination with the fifth possible implementation manner of the first aspect, in a sixth possible implementation manner, the primary sending terminal is further configured to send the first indication to the secondary sending terminal.

In combination with the fifth possible implementation manner or the sixth possible implementation manner of the first aspect, in a seventh possible implementation manner, before clearing the correctly received data cached in the secondary sending terminal according to the BA, the secondary sending terminal is further configured to receive the first indication sent by the primary sending terminal.

In combination with the seventh possible implementation manner of the first aspect, in an eighth possible implementation manner, the secondary sending terminal is specifically configured to:

obtain a second indication according to the BA, wherein the second indication is used for indicating the data correctly received by the each receiving terminal, which is obtained by the secondary sending terminal;

calculate a union set of the data indicated by the first indication and the data indicated by the second indication; and clear, according to a result of the union set calculation, data corresponding to the result, which is cached in the secondary sending terminal.

In a second aspect, an embodiment of the present invention provide a communication system, including a primary sending terminal, at least one secondary sending terminal sharing a channel with the primary sending terminal, at least one first receiving terminal associated with the primary sending terminal and at least one second receiving terminal associated with the secondary sending terminal, wherein, the primary sending terminal is configured to:

respectively send first data corresponding to each first receiving terminal to the each first receiving terminal;

respectively send a first block acknowledgement request BAR corresponding to the first data to the each first receiving terminal;

receive a first block acknowledgement BA corresponding to the first BAR and sent by the each first receiving terminal respectively; and if the first BA indicates that the first data are correctly received by the each first receiving terminal, clear the first data cached in the primary sending terminal, or if the first BA indicates that the first data are not correctly received by the each first receiving terminal, respectively retransmit first data which is not correctly received, and clear correctly received first data cached in the primary sending terminal, wherein the first BAR and the first BA carry a preset sequence indication, the sequence indication is used for indicating the sequence of the secondary sending terminal for sending second BAR corresponding to second data, and the second BAR carries the sequence indication;

the secondary sending terminal is configured to:

synchronously send the second data corresponding to the each second receiving terminal to the each second receiving terminal with the primary sending terminal through a shared channel;

obtain the first BA sent by the each first receiving terminal through the shared channel respectively, and obtain the sequence indication according to the first BA;

sequentially send the second BAR to the each second receiving terminal according to the sequence indication respectively;

receive second BA corresponding to the second BAR and sent by the each second receiving terminal respectively, wherein the second BA carries the sequence indication; and if the second BA indicates that the second data are correctly received by the each second receiving terminal, clear the second data cached in the secondary sending terminal, or if the second BA indicates that the second data are not correctly received by the each second receiving terminal, respectively retransmit the second data which is not correctly received, and clear the correctly received second data cached in the secondary sending terminal;

the first receiving terminal is configured to:

receive the first data and the first BAR sent by the primary sending terminal; and send the first BA corresponding to the first BAR to the primary sending terminal; and the second receiving terminal is configured to:

receive the second data and the second BAR sent by the secondary sending terminal; and send the second BA corresponding to the second BAR to the secondary sending terminal.

In a first possible implementation manner of the second aspect, after respectively sending the first BAR corresponding to the first data to the each first receiving terminal, the primary sending terminal is further configured to resend, if not receiving the first BA corresponding to the first BAR after a preset time, the first BAR to each first receiving terminal which does not sending back the first BA.

In combination with the foregoing second aspect or the first possible implementation manner of the second aspect, in a second possible implementation manner, after receiving the first BA sent by the each first receiving terminal respectively, the primary sending terminal is further configured to send, if the first BA indicates that the first data are not correctly received by the each first receiving terminal, a first data indication to the each first receiving terminal not correctly receiving the first data, wherein the first data indication is used for indicating the first data which are not correctly received by the each first receiving terminal.

In combination with the foregoing second aspect or any implementation manner from the first possible implementation manner to the second possible implementation manner of the second aspect, in a third possible implementation manner, after respectively sending the second BAR corresponding to the second data to the each second receiving terminal respectively, the secondary sending terminal is further configured to resend, if not receiving the second BA corresponding to the second BAR after the preset time, the second BAR to each second receiving terminal which does not sending back the second BA.

In combination with the foregoing second aspect or any implementation manner from the first possible implementation manner to the third possible implementation manner of the second aspect, in a fourth possible implementation manner, after receiving the second BA sent by the each second receiving terminal respectively, the secondary sending terminal is further configured to send, if the second BA indicates that the second data are not correctly received by the each second receiving terminal, a second data indication to the each second receiving terminal not correctly receiving the second data, wherein the second data indication is used for indicating the second data which are not correctly received by the second receiving terminals.

In combination with the foregoing second aspect or any implementation manner from the first possible implementation manner to the fourth possible implementation manner of the second aspect, in a fifth possible implementation manner, there are more than two secondary sending terminals, the sequence indication indicates that a secondary sending terminal belonging to a same basic service set BSS as the primary sending terminal performs a sending at first, and then a secondary sending terminal not belonging to the same BSS as the primary sending terminal performs a sending, the sequence indication includes an identifier of the primary sending terminal and an identifier of the secondary sending terminal, wherein the identifier of the primary sending terminal includes a media access control MAC address or an associated identity AID of the primary sending terminal, and the identifier of the secondary sending terminal respectively include an MAC address or an AID of each secondary sending terminal.

In combination with the foregoing second aspect or any implementation manner from the first possible implementation manner to the fifth possible implementation manner of the second aspect, in a sixth possible implementation manner, there are more than two first receiving terminals and more than two second receiving terminals, the sequence indication further includes an identifier of the each first receiving terminal, for indicating a sequence of the each first receiving terminal for sending the first BA respectively, the sequence indication further includes an identifier of the second receiving terminal, for indicating a sequence of the each second receiving terminal for sending the second BA respectively, wherein the identifier of the each first receiving terminal respectively include an MAC address or AID of the each first receiving terminal, and the identifier of the each second receiving terminal respectively include an MAC address or AID of the each second receiving terminal.

In a third aspect, an embodiment of the present invention provide a sending apparatus, applied to a wireless communication system which obtains a channel based on a way of competition, the communication system including a primary sending terminal, at least one sending apparatus sharing a channel with the primary sending terminal and at least one receiving terminal, wherein the sending apparatus includes:

a sending unit, configured to simultaneously send data to the each receiving terminal with the primary sending terminal through a shared channel, and simultaneously retransmit, when the each receiving terminal do not correctly receive the data, data which is not correctly received with the primary sending terminal through the shared channel;

a storage unit, configured to cache the data;

an obtaining unit, configured to obtain a block acknowledgement BA sent by the each receiving terminal through the shared channel respectively; and a clearing unit configured to clear, if the BA indicates that the data is correctly received by the each receiving terminal respectively, the data cached in the storage unit, or clear, if the BA indicates that the data are not correctly received by the each receiving terminal, correctly received data cached in the storage unit.

In a first possible implementation manner of the third aspect, the sending apparatus further includes a receiving unit;

before the clearing unit clears the correctly received data cached in the storage unit, the receiving unit is configured to receive a first indication sent by the primary sending terminal, wherein the first indication is used for indicating data correctly received by the each receiving terminal, which is obtained by the primary sending terminal.

In combination with the first possible implementation manner of the third aspect, in a second possible implementation manner, the obtaining unit is further configured to obtain a second indication according to the BA, wherein the second indication is used for indicating the data correctly received by the each receiving terminal, which is obtained by the sending apparatus;

the clearing unit is specifically configured to calculate a union set of the data indicated by the first indication and the data indicated by the second indication, and clear, according to a result of the union set calculation, data corresponding to the result, which cached in the storage unit.

In a fourth aspect, the embodiments of the present invention further provide a sending apparatus, applied to a wireless communication system which obtains a channel based on a way of competition, the communication system including a primary sending terminal, at least one sending apparatus sharing a channel with the primary sending terminal, at least one first receiving terminal associated with the primary sending terminal and at least one second receiving terminal associated with the sending apparatus, wherein the sending apparatus includes:

a sending unit, configured to synchronously send second data corresponding to each second receiving terminal to the each second receiving terminal with the primary sending terminal through a shared channel;

an obtaining unit, configured to obtain a first block acknowledgement BA sent by the each first receiving terminal through the shared channel respectively, and obtain a preset sequence indication according to the first BA, wherein the first BA carries the sequence indication, the sequence indication is used for indicating a sequence of the sending apparatus for sending a second block acknowledgement request BAR corresponding to the second data sent by the sending unit, and the second BAR carries the sequence indication;

the sending unit is further configured to respectively send the second BAR to the each second receiving terminal according to the sequence indication obtained by the obtaining unit, and respectively retransmit, when the each second receiving terminal does not correctly receive the second data, second data which are not correctly received;

a storage unit, configured to cache the second data;

a receiving unit, configured to receive second BA sent by the each second receiving terminal respectively after the sending unit respectively sends the second BAR, wherein the second BA carries the sequence indication;

a clearing unit configured to clear, if the second BA received by the receiving unit indicates that the second data are correctly received by the each second receiving terminal, the second data cached in the storage unit, or clear if the second BA indicates that the second data are not correctly received by the each second receiving terminal, correctly received second data cached in the storage unit.

In a first possible implementation manner of the fourth aspect, the sending unit is further configured to resend, if the receiving unit does not receive second BA corresponding to the second BAR after a preset time, the second BAR to the each second receiving terminal not sending back the second BA after the sending unit respectively sends the second BAR corresponding to the second data to the each second receiving terminal.

In a second possible implementation manner of the fourth aspect, the sending unit is further configured to send, if the second BA indicates that the second data are not correctly received by the each second receiving terminal, a second data indication to the each second receiving terminal not correctly receiving the second data after the receiving unit receives the second BA sent by the each second receiving terminal respectively, wherein the second data indication is used for indicating the second data which are not correctly received by the each second receiving terminal.

In a fifth aspect, an embodiment of the present invention provides a communication method for multiple access points, applied to a wireless communication system which obtains a channel based on a way of competition, the communication system including a primary sending terminal, at least one secondary sending terminal sharing a channel with the primary sending terminal and at least one receiving terminal, wherein the method includes:

simultaneously sending, by the secondary sending terminal, data to the each receiving terminal with the primary sending terminal through a shared channel;

obtaining, by the secondary sending terminal, a block acknowledgement BA sent by the each receiving terminal through the shared channel respectively; and if the BA indicates that the data are correctly received by the each receiving terminal respectively, clearing, by the secondary sending terminal, the data cached in the secondary sending terminal;

or, if the BA indicates that the data are not correctly received by the each receiving terminal, simultaneously retransmitting, by the secondary sending terminal, the data which are not correctly received with the primary sending terminal through the shared channel, and clearing, by the secondary sending terminal, the correctly received data cached in the secondary sending terminal.

In a first possible implementation manner of the fifth aspect, before the clearing, by the secondary sending terminal, the data cached in the secondary sending terminal, the method further includes:

receiving, by the secondary sending terminal, a first indication sent by the primary sending terminal, wherein the first indication is used for indicating the data correctly received by the each receiving terminal and obtained by the primary sending terminal.

In combination with the first possible implementation manner of the fifth aspect, in a second possible implementation manner, the clearing, by the secondary sending terminal, the data cached in the secondary sending terminal specifically includes:

obtaining, by the secondary sending terminal, a second indication according to the BA, wherein the second indication is used for indicating the data correctly received by the each receiving terminal, which is obtained by the sending apparatus;

calculating, by the secondary sending terminal, a union set of the data indicated by the first indication and the data indicated by the second indication; and clearing, by the secondary sending terminal according to a result of the union set calculation, data corresponding to the result, which is cached in the secondary sending terminal.

In a sixth aspect, an embodiment of the present invention further provides a communication method for multiple access points, applied to a wireless communication system which obtains a channel based on a way of competition, the communication system including a primary sending terminal, at least one secondary sending terminal sharing a channel with the primary sending terminal, at least one first receiving terminal associated with the primary sending terminal and at least one second receiving terminal associated with the secondary sending terminal, wherein the method includes:

synchronously sending, by the secondary sending terminal, second data corresponding to each second receiving terminal to the each second receiving terminal with the primary sending terminal through a shared channel;

obtaining, by the secondary sending terminal, a first block acknowledgement BA sent by the each first receiving terminal through the shared channel respectively, and obtaining a preset sequence indication according to the first BA, wherein the first BA carries the sequence indication, the sequence indication is used for indicating the sequence of the secondary sending terminal for sending a second block acknowledgement request BAR corresponding to the second data, and the second BAR carries the sequence indication;

respectively sending, by the secondary sending terminal, the second BAR to the each second receiving terminal according to the sequence indication;

receiving, by the secondary sending terminal, the second BA corresponding to the second BAR and sent by the each second receiving terminal respectively, wherein the second BA carries the sequence indication; and if the second BA indicates that the second data are correctly received by the each second receiving terminal, clearing, by the secondary sending terminal, the second data cached in the secondary sending terminal;

or, if the second BA indicates that the second data are not correctly received by the each second receiving terminal, retransmitting, by the secondary sending terminal, second data which are not correctly received, and clearing correctly received second data cached in the secondary sending terminal.

In a first possible implementation manner of the sixth aspect, after the respectively sending, by the secondary sending terminal, the second BAR to the second receiving terminals, the method further includes:

if not receiving second BA corresponding to the second BAR after a preset time, resending, by the secondary sending terminal, the second BAR to the each second receiving terminal which does not sending back the second BA.

In a second possible implementation manner of the sixth aspect, after the receiving, by the secondary sending terminal, the second BA sent by the each second receiving terminal respectively, the method further includes:

if the second BA indicates that the second data are not correctly received by the each second receiving terminal, sending, by the secondary sending terminal, a second data indication to the each second receiving terminal not correctly receiving the second data, wherein the second data indication is used for indicating the second data which are not correctly received by the each second receiving terminal.

A communication method, apparatus and system for multiple access points are provided by an embodiment of the present invention, wherein after the primary sending terminal and the secondary sending terminal simultaneously send the data corresponding to each receiving terminal to the each receiving terminal through a shared channel respectively, the primary sending terminal respectively sends the BAR corresponding to the data to the each receiving terminal, receives a BA corresponding to the BAR which is sent by the each receiving terminal, if the BA indicates that the data are correctly received by the each receiving terminal, clears the data cached in the primary sending terminal, and if the BA indicates that the data are not correctly received by the each receiving terminal, retransmits data which is not correctly received and clears correctly received data cached in the primary sending terminal. By means of the solution, since the primary sending terminal can learn, according to the BA sent back by the each receiving terminal, data receiving condition of the each receiving terminal, retransmit the data which are not correctly received according to the indication of the BA and clear the correctly received data cached in the primary sending terminal when multiple sending terminals and multiple receiving terminals transmit data together, error recovery for data which fails to be received by the each receiving terminal is therefore performed, and thereby the reliability of data transmission is guaranteed and the throughput of system is improved.

BRIEF DESCRIPTION OF DRAWINGS

To illustrate technical solutions in an embodiment of the present invention or in the prior art more clearly, a brief introduction on accompanying drawings which are needed in description of an embodiment or the prior art is given below. Apparently, the accompanying drawings in the description below are merely some of the embodiments of the present invention.

DESCRIPTION OF EMBODIMENTS

A clear and complete description of technical solutions in embodiments of the present invention will be given below, in combination with the accompanying drawings in the embodiments of the present invention. Apparently, the embodiments described are merely a part, but not all, of the embodiments of the present invention.

A variety of techniques described herein may be applied to a variety of wireless communication systems, for example, present 2G and 3G communication systems and the next generation communication system, such as a global system for mobile communications (GSM), a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single carrier frequency division multiple access (SC-FDMA) system, a general packet radio service (GPRS) system, a long term evolution (LTE) system, and other similar communication systems.

Embodiment 1

Figure 1:
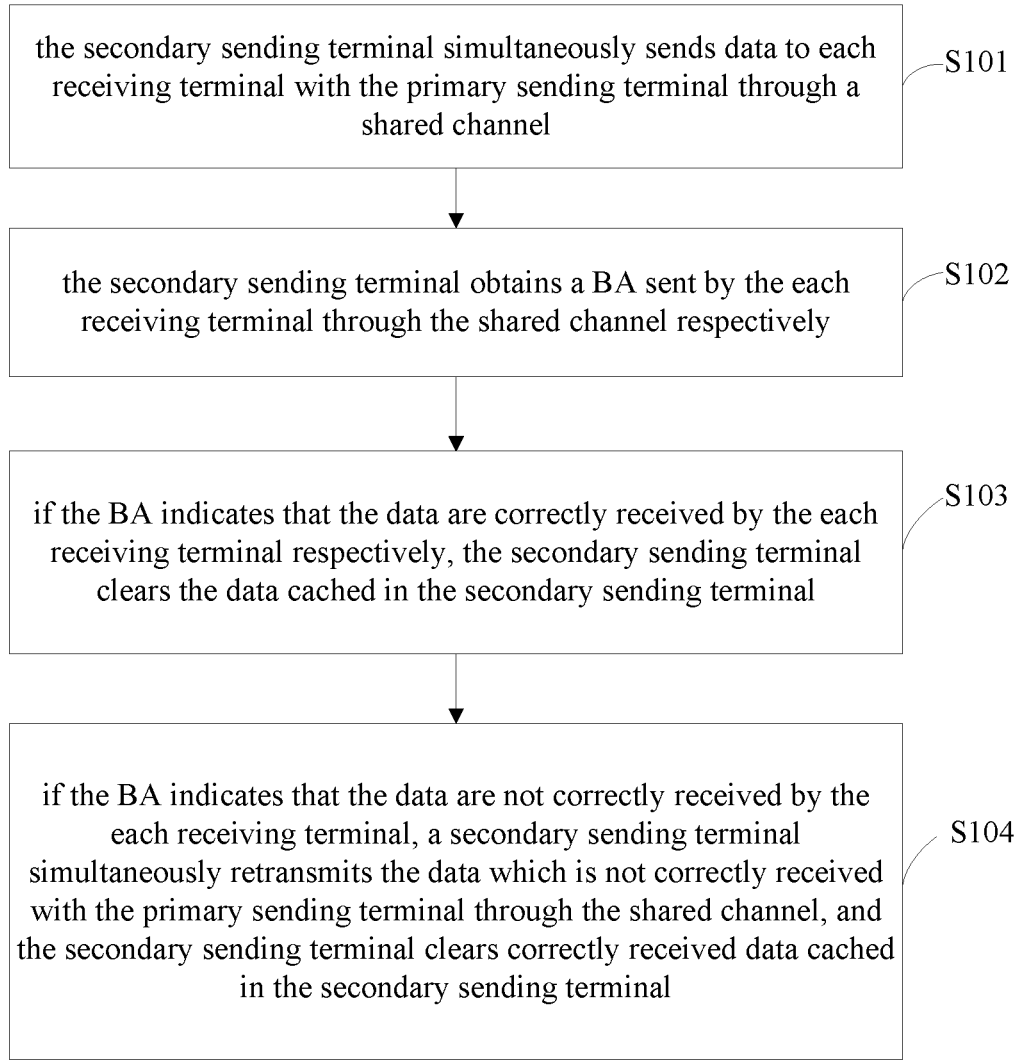
FIG. 1 is a first flowchart of a communication method for multiple access points provided by an embodiment of the present invention.

An embodiment of the present invention provides a communication method for multiple access points. As shown in FIG. 1, it is applied to a wireless communication system which obtains a channel based on a way of competition. The communication system includes a primary sending terminal, at least one secondary sending terminal sharing a channel with the primary sending terminal and at least one receiving terminal, the method relates to the secondary sending terminal. The method may include:

S101. the secondary sending terminal simultaneously sends data to each receiving terminal with the primary sending terminal through a shared channel.

In a multiuser MIMO system, along with rapid growth of a requirement of throughput of the overall network, an interference problem of the network has become a key factor obstructing a further improvement of network capacity. It has become a development tendency to eliminate the interference problem of network and even to increase the throughput of the overall network using the network interference problem in an angle of multiple sending terminals, for example, using a method such as a cooperative transmission (cooperative transmission), a coordinated beamforming (coordinated beamforming)/interference alignment (interference alignment), etc.

The above-mentioned cooperative transmission is that multiple sending terminals in a multiuser MIMO system form an MIMO sending terminal with more antennas after sharing data and channel information, and moreover this MIMO sending terminal with more antennas may send data to one receiving terminal or simultaneously send data to multiple receiving terminals.

There is provided a communication method for multiple access points by an embodiment of the present invention, which is applied to the wireless communication system which obtains a channel based on a way of competition. The multiple sending terminals adopt a flow of error recovery of a cooperative transmission method during data transmission, wherein the error recovery may be defined as that a sending terminal retransmits data which are not correctly received by a receiving terminal. In data transmission, if a receiving terminal does not correctly receive data sent by a sending terminal, through the error recovery, it may be guaranteed that the receiving terminal correctly receives the data sent by the sending terminal.

In a wireless communication system in which multiple sending terminals send data in a method of cooperative transmission, a primary sending terminal (the rest sending terminals may be treated as secondary sending terminals) needs to be preset from multiple sending terminals at first, and the primary sending terminal is responsible for obtaining a receiving condition of data sent from all sending terminals to each receiving terminal from each receiving terminal. Therefore, when the data are not correctly received by the each receiving terminal, the primary sending terminal or the primary sending terminal and a corresponding secondary sending terminal may retransmit data which are not correctly received to each receiving terminal which does not correctly receive the data, so as to guarantee reliability of data transmission.

Exemplarily, a wireless communication system provided by the embodiment of the present invention includes a primary sending terminal, at least one secondary sending terminal sharing a channel with the primary sending terminal and at least one receiving terminal, wherein the primary sending terminal and the at least one secondary sending terminal share data which needs to be sent to the each receiving terminal and channel information necessary for sending the data. During a communication in the wireless communication system, at least one secondary sending terminal and the primary sending terminal simultaneously send the data corresponding to the each receiving terminal, which is to be sent, to the each receiving terminal.

If there is only one receiving terminal, the above-mentioned data are single-user data, and if there are two or more receiving terminals, the above-mentioned data are multiuser data. The multiuser data contains mutually independent data for multiple receiving terminals, namely data corresponding to the each receiving terminal. Each sending terminal caches the multiuser data in a sharing manner and independently sends the multiuser data to the each receiving terminal in a spatial multiplexing manner at the same time.

In the embodiment of the present invention, the secondary sending terminal simultaneously sends data to the each receiving terminal with the primary sending terminal through the shared channel, wherein the data is data which needs to be simultaneously sent by the primary sending terminal and the secondary sending terminal to each receiving terminal and which corresponds to the each receiving terminal respectively. Namely, the data simultaneously sent by the primary sending terminal and the secondary sending terminal to the each receiving terminal is mutually independent data of the each receiving terminal.

S102. the secondary sending terminal obtains a block acknowledgement (BA) sent by the each receiving terminal through the shared channel respectively.

After the primary sending terminal and the secondary sending terminal send the data corresponding to each receiving terminal to each receiving terminal, the primary sending terminal sends a block acknowledgement request (BAR) corresponding to the data to the each receiving terminal.

It should be noted that, the BAR is a request message used for determining a receiving conditions of the each receiving terminal on the data sent by the primary sending terminal and the secondary sending terminal. The BAR respectively corresponds to the data sent to the each receiving terminal. Namely, if there is only one receiving terminal, then there is only one BAR, and if there are multiple receiving terminals, then the BAR has single indication information for each receiving terminal. The specific representation manner may be that each receiving terminal has one BAR which is used for requesting the receiving terminal to send a corresponding BA.

Further, each receiving terminal may generate a BA according to a receiving condition thereof on the data sent by the primary sending terminal and the secondary sending terminal. Namely, a BA may be used for indicating a receiving condition of the each receiving terminal on data, i.e., the receiving succeeds or fails, so that the primary sending terminal and the secondary sending terminal may learn a result of data transmission according to the BA sent back by the each receiving terminal, i.e., data transmission succeeds or fails.

Those of ordinary skill in the art may understand that, in a method of cooperative transmission, after multiple sending terminals obtain the right of use a channel by competition, the multiple sending terminals send the data to each receiving terminal using a same channel, namely a shared channel. Namely, the primary sending terminal and the secondary sending terminal may simultaneously send data corresponding to each receiving terminal to each receiving terminal. Correspondingly, the primary sending terminal and the secondary sending terminal may also simultaneously receive a BA sent by each receiving terminal through the shared channel respectively. That is to say, when the each receiving terminal send the BA to the primary sending terminal, since the primary sending terminal and the secondary sending terminal share the channel, the secondary sending terminal may also obtain the BA.

S103. if the BA indicates that the data are correctly received by the each receiving terminal respectively, the secondary sending terminal clears the data cached in the secondary sending terminal.

After a secondary sending terminal obtains a BA sent by each receiving terminal through the shared channel respectively, the secondary sending terminal may learn a receiving condition of data of the each receiving terminal according to the BA, i.e., the receiving succeeds or fails. If the BA indicates that the data are correctly received by each receiving terminal respectively, the secondary sending terminal may clear the data cached in the secondary sending terminal.

S104. if the BA indicates that the data are not correctly received by the each receiving terminal, a secondary sending terminal simultaneously retransmits the data which is not correctly received with the primary sending terminal through the shared channel, and the secondary sending terminal clears correctly received data cached in the secondary sending terminal.

If the BA indicates that the data are not correctly received by the each receiving terminal, the secondary sending terminal simultaneously retransmits data which is not correctly received by the each receiving terminal with the primary sending terminal through the shared channel, and the secondary sending terminal clears data correctly received by the each receiving terminal, which is cached in the secondary sending terminal.

That the data is not correctly received by the each receiving terminal, which is mentioned above, may include: none of each receiving terminal correctly receives the data sent by the primary sending terminal and the secondary sending terminal; or a part of receiving terminals correctly receive the data sent by the primary sending terminal and the secondary sending terminal, but a part of receiving terminals do not correctly receive the data sent by the primary sending terminal and the secondary sending terminal. In particular, that a certain receiving terminal does not correctly receive the data may include: the receiving terminal does not correctly receive all the data, and the receiving terminal does not correctly receive a part of the data.

In particular, the secondary sending terminal and the primary sending terminal retransmit the data which is not correctly received by the each receiving terminal, namely performing error recovery of the data to guarantee reliability of data transmission.

It should be noted that, since the multiple sending terminals and the multiple receiving terminals share a channel, for a BA from the each receiving terminal, the secondary sending terminal and the primary sending terminal may simultaneously receive the BA.

There is provided a communication method for multiple access points by the embodiment of the present invention. Since error recovery can be supported during the multiple sending terminals and the multiple receiving terminals transmit the data simultaneously, thereby the reliability of data transmission is guaranteed and the throughput of the system is improved.

There is provided a communication method for multiple access points by the embodiment of the present invention. The secondary sending terminal and the primary sending terminal simultaneously send the data corresponding to each receiving terminal to each receiving terminal through the shared channel respectively, and the secondary sending terminal obtains the BA sent by the each receiving terminal through the shared channel respectively. If the BA indicates that the data are correctly received by the each receiving terminal, the data cached in the primary sending terminal is cleared, and if the BA indicates that the data are not correctly received by the receiving terminals, the data which are not correctly received is retransmitted and the correctly received data cached in the primary sending terminal is cleared. By means of the solution, since the primary sending terminal can learn, according to the BA sent back by the each receiving terminal, data receiving condition of the each receiving terminal, retransmit the data which are not correctly received according to the indication of the BA and clear the correctly received data cached in the primary sending terminal when multiple sending terminals and multiple receiving terminals transmit data together, error recovery for data which fails to be received by the each receiving terminal is therefore performed, and thereby the reliability of data transmission is guaranteed and the throughput of system is improved.

Figure 2:
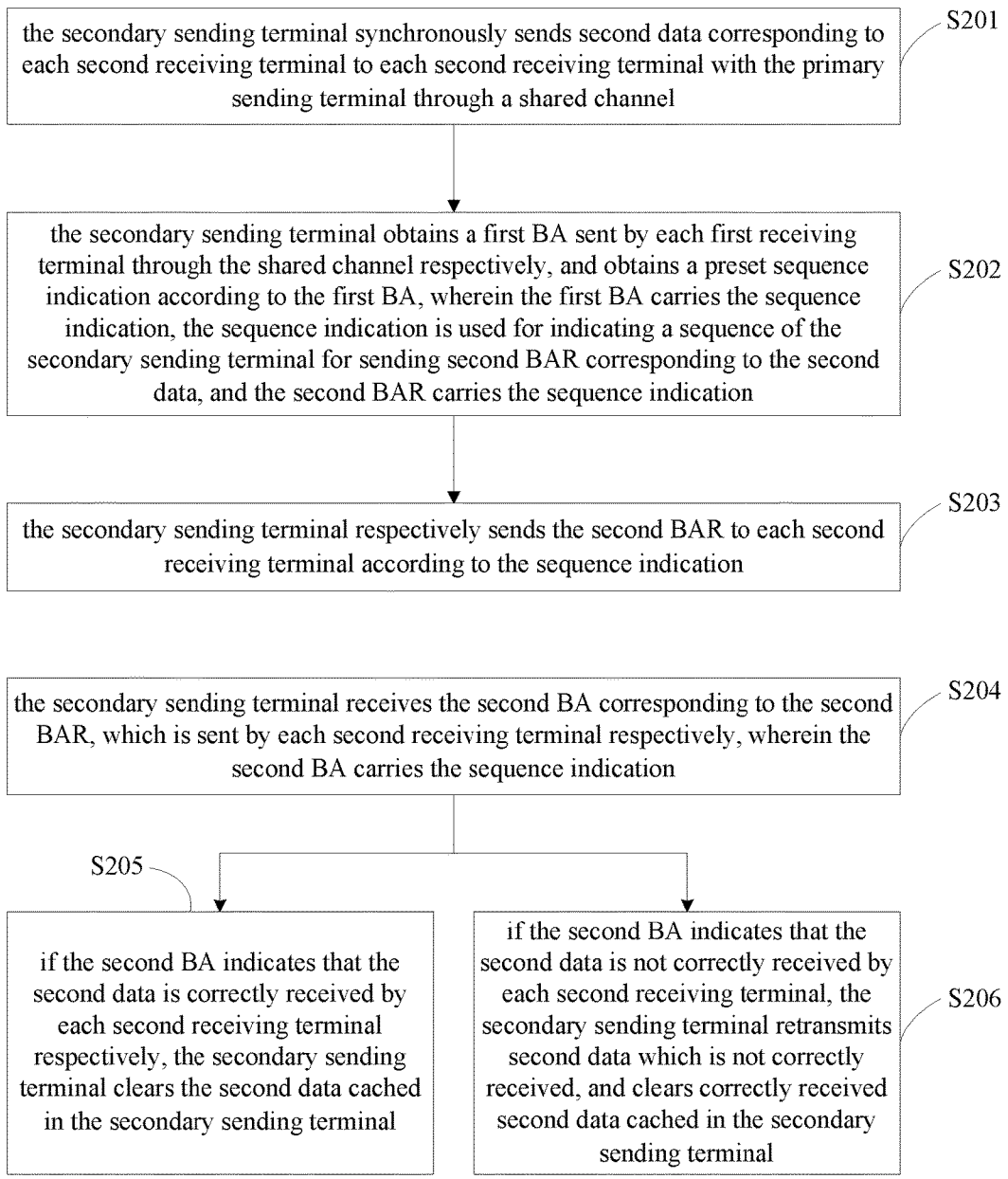
FIG. 2 is a first flowchart of another communication method for multiple access points provided by an embodiment of the present invention.

An embodiment of the present invention provides another communication method for multiple access points. As shown in FIG. 2, the communication method is applied to a wireless communication system which obtains a channel based on a way of competition. The communication system includes a primary sending terminal, at least one secondary sending terminal sharing a channel with the primary sending terminal, at least one first receiving terminal associated with the primary sending terminal and at least one second receiving terminal associated with the secondary sending terminal. The method relates to a secondary sending terminal, and the method may include:

S201. the secondary sending terminal synchronously sends second data corresponding to each second receiving terminal to each second receiving terminal with the primary sending terminal through a shared channel.

In a multiuser MIMO system, along with rapid growth of a requirement of throughput of the overall network, an interference problem of the network has become a key factor obstructing a further improvement of network capacity. It has become a development tendency to eliminate the interference problem of network and even to increase the throughput of the overall network using the network interference problem in an angle of multiple sending terminals, for example, using a method such as a cooperative transmission, a coordinated beamforming/interference alignment, etc.

The above-mentioned coordinated beamforming is that after multiple sending terminals in the multiuser MIMO system share a part of or all of channel information, a reasonable transmission solution is calculated according to the respective transmission features of the multiple sending terminals to enable the multiple sending terminals to simultaneously send data to multiple receiving terminals, and mutual non-interference or mutual interference may be ignored to a certain degree. The interference alignment is that after multiple sending terminals simultaneously send data, signals arriving at receiving terminals lie in an orthogonal dimension which makes the receiving terminals separate useful signals effectively.

There is provided another communication method for multiple access points by the embodiment of the present invention, which is applied to a wireless communication system obtaining a channel based on a way of competition. The multiple sending terminals adopt a flow of error recovery of a method of coordinated beamforming/interference alignment during data transmission.

In a wireless communication system in which the multiple sending terminals send data using a method of coordinated beamforming/interference alignment, a primary sending terminal needs to be preset from the multiple sending terminals at first. Then, starting from the primary sending terminal, the multiple sending terminals sequentially obtain a receiving condition of each receiving terminal on the data sent by the same, so that when the each receiving terminal does not correctly receive the data, a corresponding sending terminal may retransmit data which are not correctly received to the corresponding receiving terminal, so as to guarantee reliability of data transmission.

In the method of coordinated beamforming/interference alignment which is adopted in the embodiment of the present invention, after the secondary sending terminal and the primary sending terminal share a part of or all of channel information, the primary sending terminal respectively sends first data corresponding to each first receiving terminal to each first receiving terminal associated with the primary sending terminal. Meanwhile, the secondary sending terminal respectively sends second data corresponding to each second receiving terminal to each second receiving terminal associated with the secondary sending terminal. Namely, the secondary sending terminal synchronously sends the second data corresponding to each second receiving terminal to each second receiving terminal with the primary sending terminal through the shared channel.

It should be noted that, "association" is a result of an association flow in the prior art. Specifically, a receiving terminal sends an association request to a sending terminal, and if the sending terminal accepts the association with the receiving terminal, namely, accepts to provide a service for the receiving terminal, it indicates that the receiving terminal is associated with the sending terminal.

Further, there are many reasons for determining whether the receiving terminal can be successfully associated with the sending terminal. For example, if receiving terminals which can be served by the sending terminal have reached an upper limit, then the association request sent by the receiving terminal will not be accepted by the sending terminal, namely the receiving terminal is not associated with the sending terminal.

If there is only one receiving terminal, the above-mentioned data are single-user data, and if there are two or more receiving terminals, the above-mentioned data are multiuser data. The multiuser data contains mutually independent data for multiple receiving terminals. Each sending terminal caches the multiuser data in a sharing manner and independently sends the multiuser data to the each receiving terminal in a spatial multiplexing manner at the same time.

S202. the secondary sending terminal obtains a first BA sent by each first receiving terminal through the shared channel respectively, and obtains a preset sequence indication according to the first BA, wherein the first BA carries the sequence indication, the sequence indication is used for indicating a sequence of the secondary sending terminal for sending second BAR corresponding to the second data, and the second BAR carries the sequence indication.

After the secondary sending terminal sends the second data to each second receiving terminal, the secondary sending terminal firstly obtains the first BA sent by each first receiving terminal through the shared channel respectively, wherein the first BA carries the preset sequence indication. The sequence indication may be used for indicating the sequence of the secondary sending terminal for sending the second BAR corresponding to the second data. Namely each secondary sending terminal in the secondary sending terminals may sequentially send the second BAR to each second receiving terminal according to the sequence indication. The second BAR also carries the sequence indication.

It should be noted that, each receiving terminal may generate a corresponding BA according to a receiving condition thereof on data sent by the primary sending terminal and the secondary sending terminal. Namely, the BA may be used for indicating that the receiving of data of each receiving terminal, which is sent by the primary sending terminal and the secondary sending terminal, succeeds or fails.

Those of ordinary skill in the art may understand that, in a method of coordinated beamforming/interference alignment, after multiple sending terminals obtain the right of use of a channel by competition, the multiple sending terminals use a same channel to send the data to receiving terminals. Namely, the secondary sending terminal and the primary sending terminal may synchronously send first data and second data of each receiving terminal associated with them to each receiving terminal associated with them respectively. Correspondingly, since the secondary sending terminal and the primary sending terminal share a channel, when a first receiving terminal send a first BA to a primary sending terminal, a secondary sending terminal can also obtain the first BA.

S203. the secondary sending terminal respectively sends the second BAR to each second receiving terminal according to the sequence indication.

After the secondary sending terminal obtains the first BA, the secondary sending terminal may respectively send a second BAR to each second receiving terminal according to the sequence indication carried in the first BA. Namely, the secondary sending terminal sequentially sends the second BAR corresponding to the second data of each second receiving terminal to each second receiving terminal according to the sequence indication.

S204. the secondary sending terminal receives the second BA corresponding to the second BAR, which is sent by each second receiving terminal respectively, wherein the second BA carries the sequence indication.

After the secondary sending terminal sends the second BAR, the secondary sending terminal may receive the second BA corresponding to the second BAR, which is sent by each second receiving terminal respectively, wherein the second BA carries the sequence indication. This is because other secondary sending terminals may continue to sequentially send the BAR according to the sequence indication carried in the second BAR.

It should be noted that, in the another communication method for multiple access points provided by the embodiment of the present invention, at first, the primary sending terminal respectively sends the first BAR corresponding to the first data to each first receiving terminal to request a receiving condition of each first receiving terminal on the first data. After each first receiving terminal respectively send back the first BA, the secondary sending terminals may sequentially send the second BAR corresponding to the second data to each second receiving terminal associated with the same according to the sequence indication in the first BA to request a receiving condition of each second receiving terminal on the second data until all the sending terminals (including the primary sending terminal and the secondary sending terminals) send requests to each receiving terminal participating in present data transmission for at least one time.

S205. if the second BA indicates that the second data is correctly received by each second receiving terminal respectively, the secondary sending terminal clears the second data cached in the secondary sending terminal.

After the secondary sending terminal receives the second BA sent by each second receiving terminal respectively, the secondary sending terminal may learn a receiving condition of each second receiving terminal on the second data, namely the receiving of the second data succeeds or fails for each second receiving terminal. If the second BA indicates that the second data are correctly received by each second receiving terminal respectively, the secondary sending terminal may clear the second data cached in the secondary sending terminal.

S206. if the second BA indicates that the second data is not correctly received by each second receiving terminal, the secondary sending terminal retransmits second data which is not correctly received, and clears correctly received second data cached in the secondary sending terminal.

If the second BA indicates that the second data are not correctly received by each second receiving terminal, the secondary sending terminal may retransmit second data which are not correctly received and clear correctly received second data cached in the secondary sending terminal, so as to guarantee reliability of transmission of the second data.

That the second data is not correctly received by each second receiving terminal, which is mentioned above, may include: none of each second receiving terminal correctly receive the second data sent by the secondary sending terminal; or a part of the second receiving terminals correctly receive the data sent by the secondary sending terminal, but a part of the second receiving terminals do not correctly receive the second data sent by the secondary sending terminal.

In particular, the secondary sending terminal retransmits the second data which is not correctly received by each second receiving terminal. Namely error recovery of the second data is performed to guarantee reliability of transmission of the second data.

It should be noted that, since the multiple sending terminals and the multiple receiving terminals share the channel, for a BA from each receiving terminal, the secondary sending terminal and the primary sending terminal may simultaneously receive the BA.

It should be noted that, when each second receiving terminal sends the second BA through the shared channel, the primary sending terminal may also receive the second BA. However, since the second BA and the sequence indication carried in the second BA are merely used for indicating other secondary sending terminals not sending the BAR to execute corresponding steps, a process of the primary sending terminal for receiving the second BA will not be described in detail in the embodiment of the present invention.

Since the error recovery between multiple sending terminals and multiple receiving terminals during simultaneous data transmission can be supported, the another communication method for multiple access points provided by the embodiment of the present invention thereby guarantees the reliability of data transmission and the throughput of the system is improved.

There is provided another communication method for multiple access points provided by the embodiment of the present invention, after the secondary sending terminal and the primary sending terminal synchronously send the second data corresponding to each second receiving terminal to each second receiving terminal, a secondary sending terminal obtains the first BA sent by each first receiving terminal through the shared channel respectively. The secondary sending terminal sends the second BAR corresponding to the second data to each second receiving terminal according to the sequence indication carried in the first BA, and receives the second BA corresponding to the second BAR, which is sent by each second receiving terminal respectively. If the second BA indicates that the second data is correctly received by each second receiving terminal, the second data cached in the secondary sending terminal is cleared, and if the second BA indicates that the second data is not correctly received by the second receiving terminals, the second data which is not correctly received is retransmitted and the correctly received second data cached in the secondary sending terminal is cleared. By means of the solution, since the primary sending terminal can learn, according to the BA sent back by the each receiving terminal, data receiving condition of the each receiving terminal, retransmit the data which are not correctly received according to the indication of the BA and clear the correctly received data cached in the primary sending terminal when multiple sending terminals and multiple receiving terminals transmit data together, error recovery for data which fails to be received by the each receiving terminal is therefore performed, and thereby the reliability of data transmission is guaranteed and the throughput of system is improved.

Embodiment 2

Figure 3:
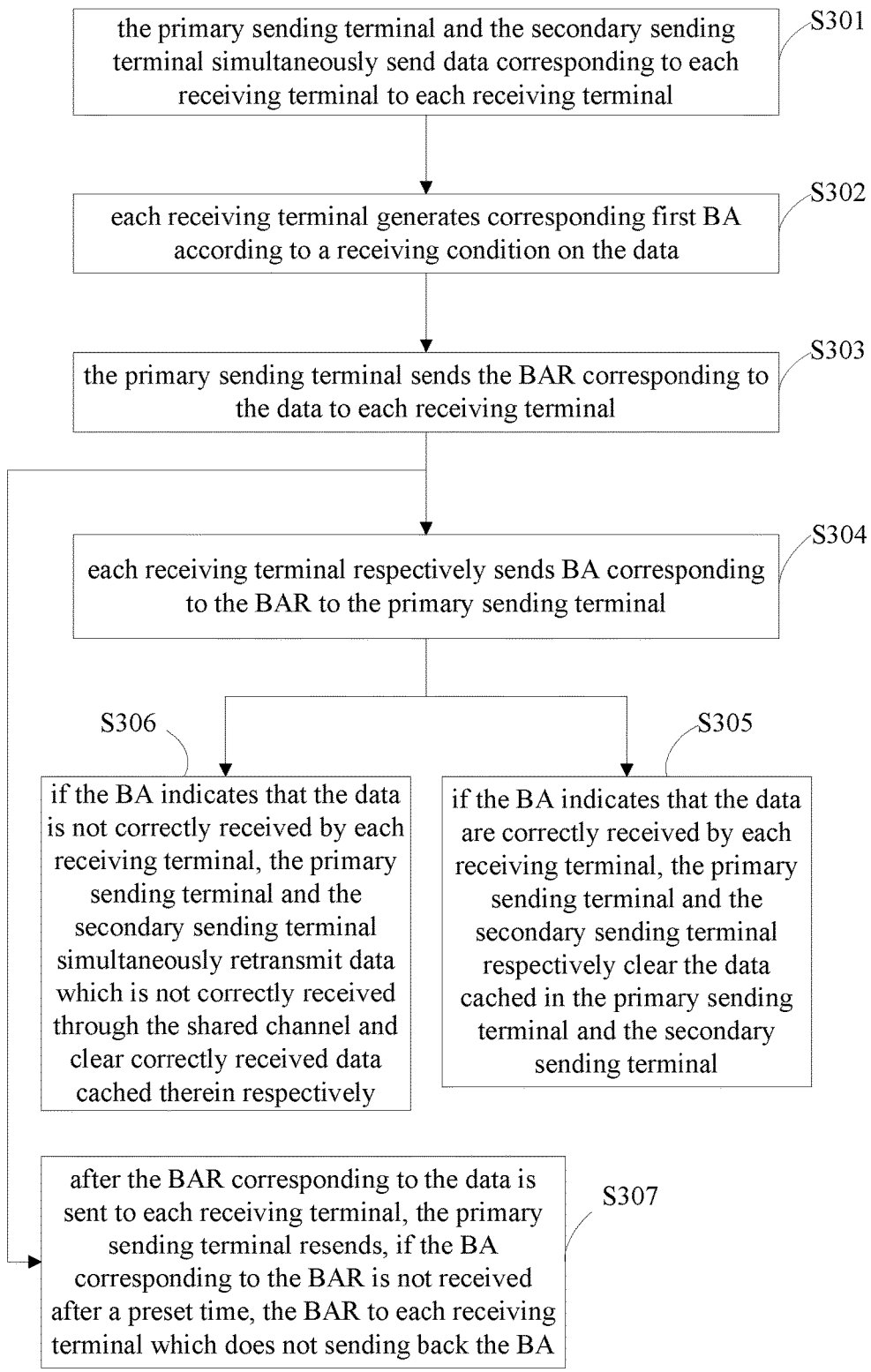
FIG. 3 is a second flowchart of a communication method for multiple access points provided by an embodiment of the present invention.

An embodiment of the present invention provides a communication method for multiple access points. As shown in FIG. 3, it is applied to a wireless communication system which obtains a channel based on a way of competition. The communication system includes a primary sending terminal, at least one secondary sending terminal sharing a channel with the primary sending terminal and at least one receiving terminal. The method may include:

S301. the primary sending terminal and the secondary sending terminal simultaneously send data corresponding to each receiving terminal to each receiving terminal.

In a multiuser MIMO system, along with rapid growth of a requirement of throughput of the overall network, an interference problem of the network has become a key factor obstructing a further improvement of network capacity. It has become a development tendency to eliminate the interference problem of network and even to increase the throughput of the overall network using the network interference problem in an angle of multiple sending terminals, for example, using a method such as a cooperative transmission, a coordinated beamforming/interference alignment, etc.

The above-mentioned cooperative transmission is that multiple sending terminals in a multiuser MIMO system form an MIMO sending terminal with more antennas after sharing data and channel information, and moreover this MIMO sending terminal with more antennas may send data to one receiving terminal or simultaneously send data to multiple receiving terminals.

There is provided a communication method for multiple access points by an embodiment of the present invention, which is applied to the wireless communication system which obtains a channel based on a way of competition. The multiple sending terminals adopt a flow of error recovery of a cooperative transmission method during data transmission, wherein the error recovery may be defined as that a sending terminal retransmits data which are not correctly received by a receiving terminal. In data transmission, if a receiving terminal does not correctly receive data sent by a sending terminal, through the error recovery, it may be guaranteed that the receiving terminal correctly receives the data sent by the sending terminal.

In a wireless communication system in which multiple sending terminals send data in a method of cooperative transmission, a primary sending terminal (the rest sending terminals may be treated as secondary sending terminals) needs to be preset from multiple sending terminals at first, and the primary sending terminal is responsible for obtaining a receiving condition of data sent from all sending terminals to each receiving terminal from each receiving terminal. Therefore, when the data are not correctly received by the each receiving terminal, the primary sending terminal or the primary sending terminal and a corresponding secondary sending terminal may retransmit data which are not correctly received to each receiving terminal which does not correctly receive the data, so as to guarantee reliability of data transmission.

Exemplarily, a wireless communication system provided by the embodiment of the present invention includes a primary sending terminal, at least one secondary sending terminal sharing a channel with the primary sending terminal and at least one receiving terminal, wherein the primary sending terminal and the at least one secondary sending terminal share data which needs to be sent to the each receiving terminal and channel information necessary for sending the data. During a communication in the wireless communication system, at least one secondary sending terminal and the primary sending terminal simultaneously send the data corresponding to the each receiving terminal, which is to be sent, to the each receiving terminal.

If there is only one receiving terminal, the above-mentioned data are single-user data, and if there are two or more receiving terminals, the above-mentioned data are multiuser data. The multiuser data contains mutually independent data for multiple receiving terminals, namely data corresponding to the each receiving terminal. Each sending terminal caches the multiuser data in a sharing manner and independently sends the multiuser data to the each receiving terminal in a spatial multiplexing manner at the same time.

In the embodiment of the present invention, the secondary sending terminal simultaneously sends data to the each receiving terminal with the primary sending terminal through the shared channel, wherein the data is data which needs to be simultaneously sent by the primary sending terminal and the secondary sending terminal to each receiving terminal and which corresponds to the each receiving terminal respectively. Namely, the data simultaneously sent by the primary sending terminal and the secondary sending terminal to the each receiving terminal is mutually independent data of the each receiving terminal.

S302. each receiving terminal generates corresponding first BA according to a receiving condition on the data.

After each receiving terminal receive the data sent by the primary sending terminal and the secondary sending terminal, each receiving terminal may generate corresponding BA according to the receiving condition on the data.

It should be noted that, a BA may be used for indicating a receiving condition of the each receiving terminal on data, i.e., the receiving succeeds or fails, so that the primary sending terminal and the secondary sending terminal may learn that the receiving of each receiving terminal for the data which is sent by the primary sending terminal and the secondary sending terminal succeeds or fails.

S303. the primary sending terminal sends the BAR corresponding to the data to each receiving terminal.

After the primary sending terminal and the secondary sending terminal simultaneously send the data corresponding to each receiving terminal to each receiving terminals, the primary sending terminal may send the BAR corresponding to the data to each receiving terminal, wherein the BAR may be used for requesting a receiving condition of each receiving terminal on the data sent by the primary sending terminal and the secondary sending terminal.

Optionally, the primary sending terminal may respectively send the BAR to each receiving terminal according to a preset sequence, wherein the preset sequence may be that a BAR is sent to each receiving terminal belonging to the same basic service set (BSS) as the primary sending terminal at first and then a BAR is sent to each receiving terminal not belonging to the same BSS as the primary sending terminal.

Optionally, the sequence of the primary sending terminal for sending the BAR may be determined by the primary sending terminal. A feasible method is that the primary sending terminal presets the sequence of sending a BAR before sending the data and sends the BAR to each receiving terminal of the data according to the preset sequence after the data is sent. Namely, the primary sending terminal may sequentially send the BAR to each receiving terminal according to the above-mentioned preset sequence. The primary sending terminal may also determine a sequence of sending the next BAR after sending the former BAR, which is not limited in the present invention.

It should be noted that, the BAR may be used for requesting a receiving condition of each receiving terminal on the data sent by the primary sending terminal and the secondary sending terminal, namely a receiving of a receiving terminal succeeds or fails.

Specifically, the primary sending terminal may send a BAR to each receiving terminal after the primary sending terminal and the secondary sending terminal simultaneously send the data to each receiving terminal. Namely the primary sending terminal sends the BAR in an explicit manner. The BAR may also be carried when the primary sending terminal and the secondary sending terminal simultaneously send the data to each receiving terminal. Namely the primary sending terminal sends the BAR in an implicit manner, which is not limited in the present invention.

Further, the preset sequence provided by the embodiment of the present invention may be that a receiving terminal in the BSS is preferential and a receiving terminal out of the BSS takes a second place. The preset sequence may also be any other sequence satisfying a communication requirement, which is not limited in the present invention, for example, a receiving terminal out of the BSS is preferential and a receiving terminal in the BSS takes the second place. Specifically, in a case of multiple first receiving terminals, the sequence of the primary sending terminal for sending the first BAR to the multiple first receiving terminals may be that the primary sending terminal firstly sends the first BAR to first receiving terminals belonging to the same BSS as the primary sending terminal and then sends the first BAR to first receiving terminals not belonging to the same BSS as the primary sending terminal; the sequence may also be that the primary sending terminal firstly sends the first BAR to first receiving terminals not belonging to the same BSS as the primary sending terminal and then sends the first BAR to first receiving terminals belonging to the same BSS as the primary sending terminal.

It may be understood that, in the communication method for multiple access points provided by the embodiment of the present invention, the primary sending terminal may sequentially send the first BAR to all receiving terminals (including receiving terminals associated with the primary sending terminal and receiving terminals associated with the secondary sending terminal). However, in the prior art, the primary sending terminal may only send the first BAR to a receiving terminal associated with the primary sending terminal.

In the present invention, the execution sequence of S302 and S303 is not limited. Namely, in the present invention, S302 may be executed before S303; S303 may be executed before S302; or S302 and S303 may also be simultaneously executed.

S304. each receiving terminal respectively sends BA corresponding to the BAR to the primary sending terminal.

After each receiving terminal respectively generate the BA, each receiving terminal respectively send, if the BAR requesting the BA from the primary sending terminal is received, the BA corresponding to the BAR to the primary sending terminal.

It should be noted that, after the BAR is sent, the primary sending terminal may start to receive the BA corresponding to the BAR after a first preset time, wherein the first preset time may be a short inter-frame space (SIFS). The SIFS provided by the embodiment of the present invention may be defined as a receiving time of the receiving terminal+a receiving/sending conversion time+a sending time of a symbol.

Further, the first preset time provided by the embodiment of the present invention starts to be calculated after a sending terminal sends a BAR. Namely, the first preset time in the embodiment of the present invention starts to be calculated after the primary sending terminal sends the BAR.

Those of ordinary skill in the art may understand that, in the method of cooperative transmission, after the multiple sending terminals obtain the right of use a channel by competition, since the primary sending terminal and the secondary sending terminal share the channel, the multiple sending terminals use the same channel to respectively send data corresponding to each receiving terminal to each receiving terminal. Namely, the primary sending terminal and the secondary sending terminal may simultaneously send the data of each receiving terminal to each receiving terminal. Correspondingly, the primary sending terminal and the secondary sending terminal may also simultaneously receive the BA sent by each receiving terminal respectively.

Figure 4:
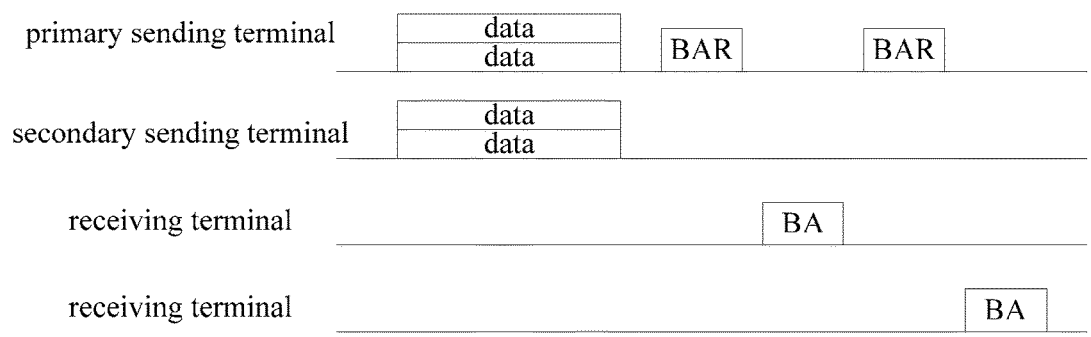
FIG. 4 is a schematic diagram of error recovery in cooperative transmission provided by an embodiment of the present invention.

As shown in FIG. 4, it is a schematic diagram of error recovery in cooperative transmission of multiple sending terminals. The multiple sending terminals share data needing to be sent to each receiving terminal and simultaneously send the data to the corresponding each receiving terminal. Then the primary sending terminal sequentially sends a BAR corresponding to the data of each receiving terminal to the corresponding each receiving terminal, so that each receiving terminal send back the BA, which indicates a receiving conditions thereof on the data and corresponds to the BAR, to the primary sending terminal.

S305. if the BA indicates that the data are correctly received by each receiving terminal, the primary sending terminal and the secondary sending terminal respectively clear the data cached in the primary sending terminal and the secondary sending terminal.

After the primary sending terminal and the secondary sending terminal obtain the BA sent by each receiving terminal, the primary sending terminal and the secondary sending terminal may learn a receiving condition of each receiving terminal on the data according to the BA, namely the receiving of the data succeeds or fails. If the BA indicates that the data are correctly received by each receiving terminal, the primary sending terminal and the secondary sending terminal respectively clear the data cached therein.

S306. if the BA indicates that the data is not correctly received by each receiving terminal, the primary sending terminal and the secondary sending terminal simultaneously retransmit data which is not correctly received through the shared channel and clear correctly received data cached therein respectively.

If the BA indicates that the data are not correctly received by each receiving terminal, the primary sending terminal and the secondary sending terminal may simultaneously retransmit the data which are not correctly received through the shared channel. Alternatively, the primary sending terminal may singly retransmit the data which are not correctly received, wherein the secondary sending terminal only retransmits corresponding data only when the primary sending terminal needs the secondary sending terminal to participate in retransmission.

Optionally, after the primary sending terminal receives the BA respectively sent by the receiving terminals, if the BA indicates that the data are not correctly received by the receiving terminals, the primary sending terminal may send a data indication to the receiving terminals not correctly receiving the data, wherein the data indication may be used for indicating the data which are not correctly received by the receiving terminals.

That the data is not correctly received by the each receiving terminal, which is mentioned above, may include: none of each receiving terminal correctly receives the data sent by the primary sending terminal and the secondary sending terminal; or a part of receiving terminals correctly receive the data sent by the primary sending terminal and the secondary sending terminal, but a part of receiving terminals do not correctly receive the data sent by the primary sending terminal and the secondary sending terminal. In particular, that a certain receiving terminal does not correctly receive the data may include: the receiving terminal does not correctly receive all the data it corresponds to, or the receiving terminal does not correctly receive a part of data it corresponds to.

When each receiving terminal does not correctly receive the data or only correctly receive a part of the data, the primary sending terminal may respectively send the data which is not correctly received by each receiving terminal to each receiving terminal again. Alternatively, the primary sending terminal and the secondary sending terminal send data which is not correctly received by each receiving terminal to each receiving terminal again through the shared channel simultaneously, so as to perform error recovery for the data which fails to be received by each receiving terminal, namely to initiate retransmission. In a case that the secondary sending terminal retransmits data which is not correctly received, the secondary sending terminal retransmits the corresponding data only when the primary sending terminal requires the secondary sending terminal to participate in retransmission.

Figure 5:
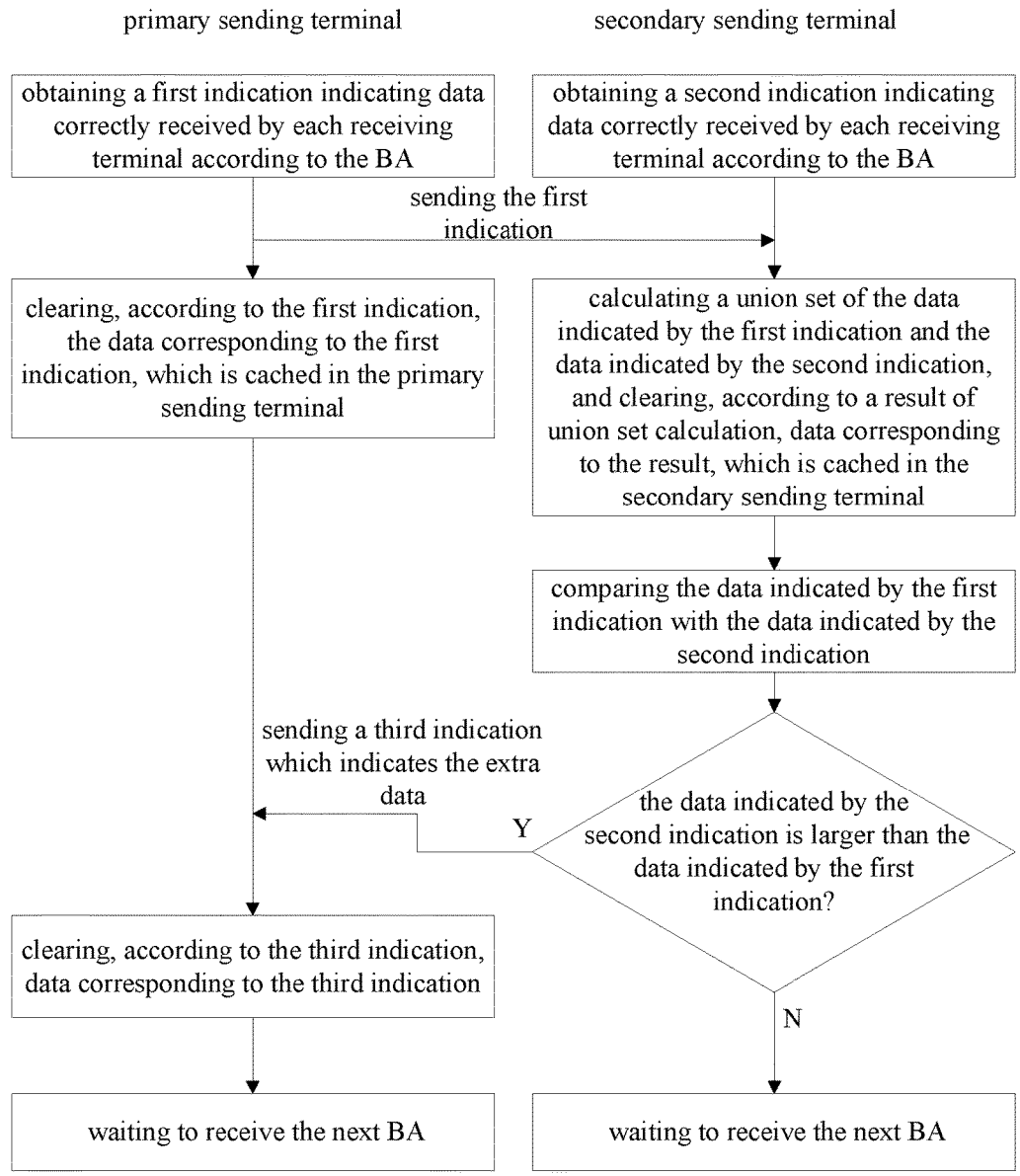
FIG. 5 is a third flowchart of a communication method for multiple access points provided by an embodiment of the present invention.

It should be noted that, since the primary sending terminal and the secondary sending terminal adopt a manner of cooperative transmission, after the primary sending terminal and the secondary sending terminal obtain the BA sent by each receiving terminal respectively, the primary sending terminal and the secondary sending terminal perform certain information interaction. As shown in FIG. 5, it may specifically include the following steps.

(1) The primary sending terminal obtains a first indication indicating data correctly received by each receiving terminal according to the BA; the secondary sending terminal obtains a second indication indicating data correctly received by each receiving terminal according to the BA.

(2) The primary sending terminal clears, according to the first indication, the data corresponding to the first indication, which is cached in the primary sending terminal, and meanwhile the primary sending terminal sends the first indication to the secondary sending terminal.

(3) After receiving the first indication, the secondary sending terminal calculates a union set of the data indicated by the first indication and the data indicated by the second indication, and clears, according to a result of union set calculation, data corresponding to the result, which is cached in the secondary sending terminal.

Optionally, (4) the secondary sending terminal compares the data indicated by the first indication with the data indicated by the second indication. If the data indicated by the second indication is larger than the data indicated by the first indication, the secondary sending terminal sends a third indication which indicates the extra data to the primary sending terminal. If the data indicated by the second indication is smaller than the data indicated by the first indication, the secondary sending terminal waits to receive the next BA.

(5) If the primary sending terminal receives the third indication from the secondary sending terminal, the primary sending terminal clears, according to the third indication, data corresponding to the third indication, which is cached in the primary sending terminal and waits to receive the next BA.

Optionally, the secondary sending terminal may only clear, according to the first indication sent by the primary sending terminal, the data corresponding to the first indication, which is cached in the secondary sending terminal without obtaining the first BA sent by each receiving terminal.

In the communication method for multiple access points provided by the embodiment of the present invention, S302 to S306 may be executed repeatedly until each receiving terminal contained in the preset sequence receive at least one BAR or a time network allocation vector (NAV) previously reserved in the system is terminated.

Further, after the primary sending terminal and the secondary sending terminal send data, no signal can be sent within a time period between the primary sending terminal sends the BAR to each receiving terminal and receives the BA sent by each receiving terminal, and the competition of the right of use the channel can be started again until the reserved time NAV is terminated.

S307. after the BAR corresponding to the data is sent to each receiving terminal, the primary sending terminal resends, if the BA corresponding to the BAR is not received after a preset time, the BAR to each receiving terminal which does not sending back the BA.

After the primary sending terminal sends the BAR, the primary sending terminal resends, if the primary sending terminal does not receive the BA sent by each receiving terminal after the preset time, the BAR to each receiving terminal, which does not sending back the BA.

It should be noted that, the above-mentioned preset time may be a point coordination function inter-frame space (PIFS), and PIFS is larger than SIFS, wherein the PIFS provided by the embodiment of the present invention may be defined as SIFS+slot time (slot time).

Optionally, the above-mentioned data indication may be sent by being carried in a BAR. It may also be sent by being carried in other messages, which is not limited in the present invention.

Further, the above-mentioned preset time is similar to the first preset time and starts to be calculated after the sending terminal sends the BAR. The preset time in the above-mentioned S307 starts to be calculated after the primary sending terminal sends the BAR.

There is provided a communication method for multiple access points by the embodiment of the present invention. Since error recovery can be supported during the multiple sending terminals and the multiple receiving terminals transmit the data simultaneously, thereby the reliability of data transmission is guaranteed and the throughput of the system is improved There is provided a communication method for multiple access points by the embodiment of the present invention. After the primary sending terminal and the secondary sending terminal simultaneously send the data corresponding to each receiving terminal to each receiving terminal through the shared channel respectively, the primary sending terminal respectively sends the BAR corresponding to the data to each receiving terminal. The primary sending terminal and the secondary sending terminal obtain the BA corresponding to the BAR, which is sent by each receiving terminal through the shared channel. If the BA indicates that the data are correctly received by each receiving terminal, the primary sending terminal and the secondary sending terminal respectively clear the data cached therein, and if the BA indicates that the data are not correctly received by each receiving terminal, the primary sending terminal and the secondary sending terminal retransmit the data which are not correctly received and respectively clear the correctly received data cached therein. By means of the solution, when the multiple sending terminals and the multiple receiving terminals transmit the data together, the multiple sending terminals may learn, according to the BA sent back by each receiving terminal, the receiving condition of each receiving terminal on the data, retransmit the data which is not correctly received according to the indication of the BA, clear the correctly received data cached therein respectively, and therefore perform error recovery for the data which fails to be received by each receiving terminal, namely initiate retransmission, thereby guaranteeing reliability of data transmission and improving throughput of system.

Figure 6:
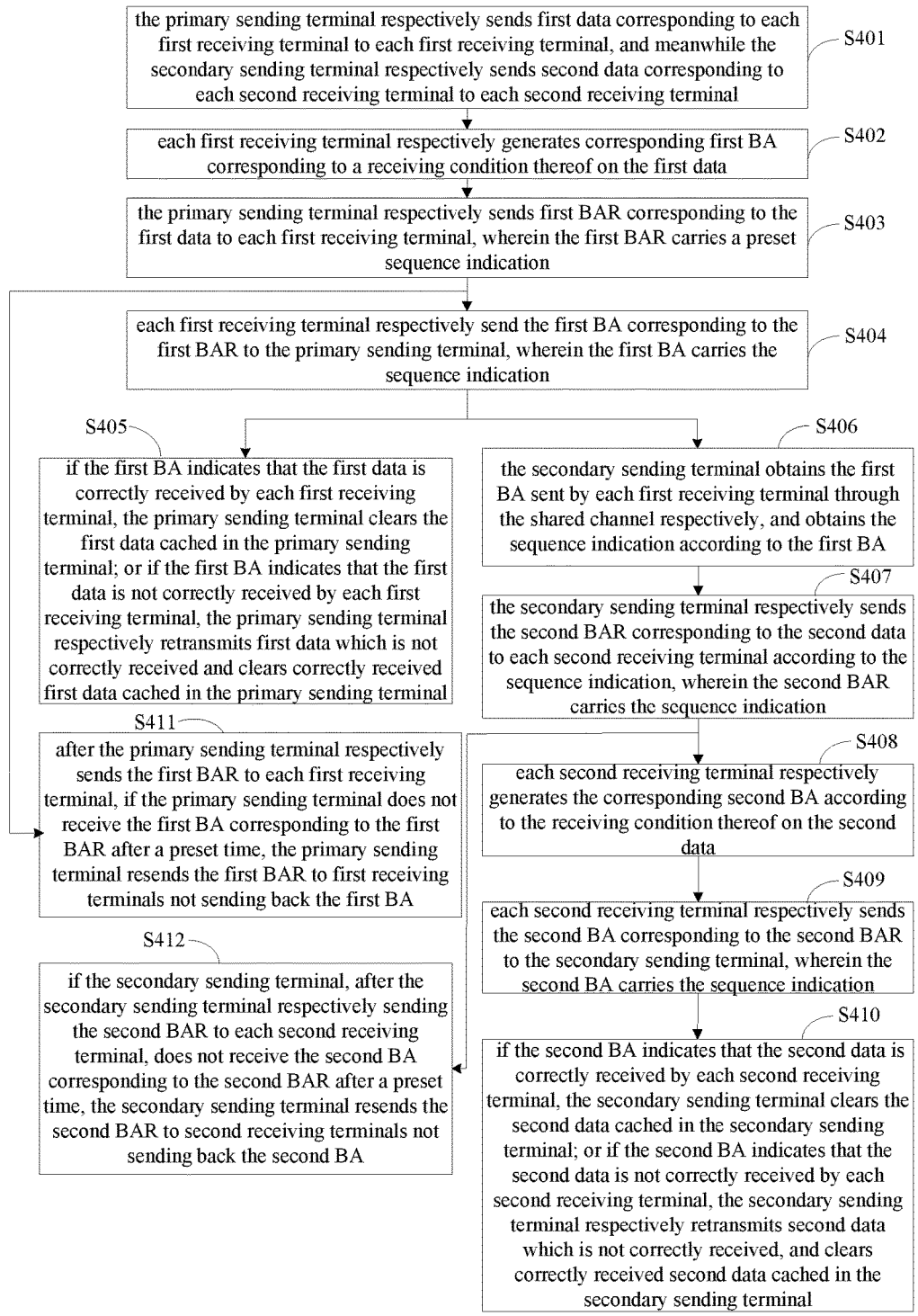
FIG. 6 is a second flowchart of another communication method for multiple access points provided by an embodiment of the present invention.

There is provided another communication method for multiple access points by an embodiment of the present invention. As shown in FIG. 6, it is applied to a wireless communication system which obtains a channel based on a way of competition. The communication system includes a primary sending terminal, at least one secondary sending terminal sharing a channel with the primary sending terminal, at least one first receiving terminal associated with the primary sending terminal and at least one second receiving terminal associated with the secondary sending terminal. The method may include:

S401. the primary sending terminal respectively sends first data corresponding to each first receiving terminal to each first receiving terminal, and meanwhile the secondary sending terminal respectively sends second data corresponding to each second receiving terminal to each second receiving terminal.

In a multiuser MIMO system, along with rapid growth of a requirement of throughput of the overall network, an interference problem of the network has become a key factor obstructing a further improvement of network capacity. It has become a development tendency to eliminate the interference problem of network and even to increase the throughput of the overall network using the network interference problem in an angle of multiple sending terminals, for example, using a method such as a cooperative transmission, a coordinated beamforming/interference alignment, etc.

The above-mentioned coordinated beamforming is that after multiple sending terminals in the multiuser MIMO system share a part of or all of channel information, a reasonable transmission solution is calculated according to the respective transmission features of the multiple sending terminals to enable the multiple sending terminals to simultaneously send data to multiple receiving terminals, and mutual non-interference or mutual interference may be ignored to a certain degree. The interference alignment is that after multiple sending terminals simultaneously send data, signals arriving at receiving terminals lie in an orthogonal dimension which makes the receiving terminals separate useful signals effectively.

There is provided another communication method for multiple access points by the embodiment of the present invention, which is applied to a wireless communication system obtaining a channel based on a way of competition. The multiple sending terminals adopt a flow of error recovery of a method of coordinated beamforming/interference alignment during data transmission.

In a wireless communication system in which the multiple sending terminals send data using a method of coordinated beamforming/interference alignment, a primary sending terminal needs to be preset from the multiple sending terminals at first. Then, starting from the primary sending terminal, the multiple sending terminals sequentially obtain a receiving condition of each receiving terminal on the data sent by the same, so that when the each receiving terminal does not correctly receive the data, a corresponding sending terminal may retransmit data which are not correctly received to the corresponding receiving terminal, so as to guarantee reliability of data transmission.

In the method of coordinated beamforming/interference alignment which is adopted in the embodiment of the present invention, after a first secondary sending terminal and the primary sending terminal share a part of or all of channel information, the primary sending terminal respectively sends first data corresponding to each first receiving terminal to each first receiving terminal associated with the primary sending terminal. Meanwhile, the secondary sending terminal respectively sends second data corresponding to each second receiving terminal to each second receiving terminal associated with the secondary sending terminal.

It should be noted that, "association" is a result of an association flow in the prior art. Specifically, a receiving terminal sends an association request to a sending terminal, and if the sending terminal accepts the association with the receiving terminal, namely, accepts to provide a service for the receiving terminal, it indicates that the receiving terminal is associated with the sending terminal.

Further, there are many reasons for determining whether the receiving terminal can be successfully associated with the sending terminal. For example, if receiving terminals which can be served by the sending terminal have reached an upper limit, then the association request sent by the receiving terminal will not be accepted by the sending terminal, namely the receiving terminal is not associated with the sending terminal.

If there is only one receiving terminal, the above-mentioned data are single-user data, and if there are two or more receiving terminals, the above-mentioned data are multiuser data. The multiuser data contains mutually independent data for multiple receiving terminals. Each sending terminal caches the multiuser data in a sharing manner and independently sends the multiuser data to the each receiving terminal in a spatial multiplexing manner at the same time.

It may be understood that, the first data is data respectively corresponding to each first receiving terminal, and the second data is data respectively corresponding to the second receiving terminal.

S402. each first receiving terminal respectively generates corresponding first BA corresponding to a receiving condition thereof on the first data.

After each first receiving terminal receives the first data, each first receiving terminal respectively generate the first BA corresponding to the receiving condition thereof on the first data.

It should be noted that, the first BA may be used for indicating the receiving condition of each first receiving terminal on the first data, namely, the receiving succeeds or fails, so that the primary sending terminal may learn, according to the first BA, the receiving condition of each first receiving terminals on the first data sent from the primary sending terminal to each first receiving terminal.

S403. the primary sending terminal respectively sends first BAR corresponding to the first data to each first receiving terminal, wherein the first BAR carries a preset sequence indication.

After the primary sending terminal respectively sends the first data corresponding to each first receiving terminal to each first receiving terminal, and meanwhile the secondary sending terminal respectively sends the second data corresponding to each second receiving terminal to each second receiving terminal, the primary sending terminal respectively sends the first BAR corresponding to the first data to each first receiving terminal at first, the first BAR carries a preset sequence indication, wherein the sequence indication is used for indicating a sequence of the secondary sending terminal for sending second BAR corresponding to the second data. Namely each secondary sending terminal sequentially sends the second BAR to each second receiving terminal associated with the same according to the sequence indication. The second BAR also carries the sequence indication, for indicating the secondary sending terminals not sending the second BAR to sequentially send the second BAR according to the sequence indication.

It may be understood that, the primary sending terminal may respectively send the first BAR to each first receiving terminal after respectively sending the first data to each first receiving terminal, namely sending the first BAR in an explicit manner. The primary sending terminal may also carry the first BAR when the first data is respectively sent to each first receiving terminal, namely sending the first BAR in an implicit manner, which is not limited in the present invention.

It should be noted that, the first BAR is a request message used for acknowledging the receiving condition of each first receiving terminal on the first data sent by the primary sending terminal; and the second BAR is a request message used for acknowledging the receiving condition of each second receiving terminal on the second data sent by the secondary sending terminal.

Further, if there are more than two secondary sending terminals, the preset sequence indication provided in the embodiment of the present invention may be that the secondary sending terminals belonging to a same BSS as the primary sending terminal perform sending at first and the secondary sending terminals not belonging to the same BSS as the primary sending terminal perform sending subsequently. Specifically, in case of multiple secondary sending terminals, the sequence of the secondary sending terminals for sending the second BAR may be that secondary sending terminals belonging to the same BSS as the primary sending terminal send second BAR to second receiving terminals associated with the same at first and secondary sending terminals not belonging to the same BSS as the primary sending terminal send the second BAR to second receiving terminals associated with the same subsequently.

Figures 7, 8, 9, 10:
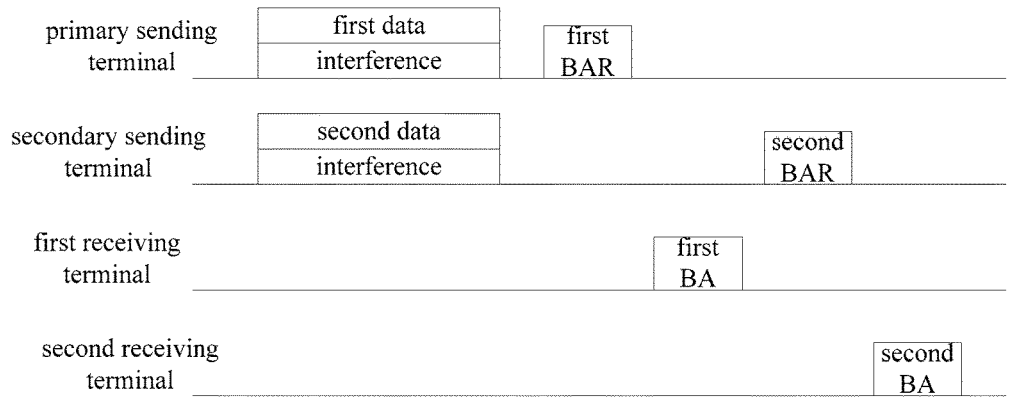
FIG. 7 is a structural schematic diagram of a BA provided by an embodiment of the present invention.
FIG. 8 is a structural schematic diagram of a sequence of sending terminal and a sequence of receiving terminal provided by an embodiment of the present invention.
FIG. 9 is a structural schematic diagram of a BAR provided by an embodiment of the present invention.
FIG. 10 is a schematic diagram of error recovery in coordinated beamforming/interference alignment provided by an embodiment of the present invention.

Exemplarily, in a schematic diagram of the first BA or the second BA as shown in FIG. 7, the sequence indication may include an identifier of the primary sending terminal and identifiers of secondary sending terminals, which is used for indicating the sequence of the secondary sending terminals for sending the BAR, wherein the identifier of the primary sending terminal includes a media access control (MAC) address of the primary sending terminal or an associated identity (AID) of the primary sending terminal, and the identifiers of the secondary sending terminals may include the MAC addresses of the secondary sending terminals or the AIDs of the secondary sending terminals.

Further, the first BA or the second BA may further include BA control, BA information and forward error correction operator and the like. The position of the sequence of the sending terminals in the sequence indication in the first BA or the second BA may be exchanged with the position of the BA information in the first BA or the second BA. In addition, in order to effectively express the existence of a sequence indication in the first BA or the second BA, an expression bit needs to be added in the MAC address or the BA control for expressing the existence of the sequence indication in the first BA or the second BA.

If there are more than two first receiving terminals, the sequence indication may further include identifiers of the first receiving terminals, for indicating the sequence of the first receiving terminals for sending the first BA respectively. And if there are more than two second receiving terminals, the sequence indication may further include identifiers of the second receiving terminals, for indicating the sequence of the second receiving terminals for sending the second BA respectively, wherein the identifier of each first receiving terminal may include an MAC address of each first receiving terminal or an AID of each first receiving terminal. The identifier of each second receiving terminal may include an MAC address of each second receiving terminal or an AID of each second receiving terminal.

As shown in FIG. 8, it is a structural schematic diagram of a sequence of each sending terminal and a sequence of each receiving terminal in a sequence indication.

As shown in FIG. 9, it is a structural schematic diagram of the first BAR or the second BAR, which is structurally similar to the first BA or the second BA. Specifically, a position of the sequence indication in the first BAR or the second BAR is similar to the position of the sequence indication in the first BA or the second BA, which will not be repeated redundantly herein.

In the present invention, an execution sequence of S402 and S403 is not limited. Namely, in the present invention, S402 may be executed before S403, S403 may be executed before then S402, or S402 and S403 may also be simultaneously executed.

S404. each first receiving terminal respectively send the first BA corresponding to the first BAR to the primary sending terminal, wherein the first BA carries the sequence indication.

After each first receiving terminal respectively generates the first BA, each first receiving terminals respectively send, if the first BAR requesting the first BA from the primary sending terminal is received, the first BA corresponding to the first BAR to the primary sending terminal.

It should be noted that, after sending the first BAR, the primary sending terminal may start to receive the first BA after a first preset time, wherein the first preset time may be SIFS. The SIFS provided by the embodiment of the present invention may be defined as a receiving time of the receiving terminal+a receiving/sending conversion time+a sending time of a symbol.

Those of ordinary skill in the art may understand that, in the method of coordinated beamforming/interference alignment, after multiple sending terminals obtain the right of use a channel by competition, the multiple sending terminals use the same channel to send respective data to receiving terminals associated with the multiple sending terminals respectively, and the multiple sending terminals may obtain the BA sent by each receiving terminal through the shared channel. Namely, the primary sending terminal and the secondary sending terminal may simultaneously send the data of each receiving terminal to each receiving terminal associated with the same respectively, and the primary sending terminal and the secondary sending terminal may also simultaneously obtain the BA sent by a certain receiving terminal.

S405. if the first BA indicates that the first data is correctly received by each first receiving terminal, the primary sending terminal clears the first data cached in the primary sending terminal. Alternatively, if the first BA indicates that the first data is not correctly received by each first receiving terminal, the primary sending terminal respectively retransmits first data which is not correctly received and clears correctly received first data cached in the primary sending terminal.

After the primary sending terminal receives the first BA, the primary sending terminal may learn, according to the first BA, a receiving condition of each first receiving terminal on the first data, namely the receiving of the first data of each first receiving terminal succeeds or fails. If the first BA indicates that the first data is correctly received by each first receiving terminal, the primary sending terminal clears the first data cached in the primary sending terminal. On the contrary, if the first BA indicates that the first data is not correctly received by each first receiving terminal, the primary sending terminal respectively retransmits the first data which is not correctly received by each receiving terminal, and the primary sending terminal clears the first data which is correctly received by each receiving terminal, so as to guarantee the reliability of the transmission of the first data.

That the first data is not correctly received by each first receiving terminal, which is mentioned above, may include: none of each first receiving terminal correctly receive the first data sent by the primary sending terminal; or a part of first receiving terminals correctly receive the first data sent by the primary sending terminal, but a part of first receiving terminals do not correctly receive the first data sent by the primary sending terminal. In particular, the condition that a certain first receiving terminal does not correctly receive the first data may include: the first receiving terminal does not correctly receive all of the first data it corresponds to, or the first receiving terminal does not correctly receive a part of the first data it corresponds to.

In the embodiment of the present invention, the primary sending terminal retransmits the first data which is not correctly received by each first receiving terminal, namely performs error recovery of the first data, to guarantee the reliability of the transmission of the first data.

S406. the secondary sending terminal obtains the first BA sent by each first receiving terminal through the shared channel respectively, and obtains the sequence indication according to the first BA.

Since the primary sending terminal and the secondary sending terminal share a channel, when each first receiving terminals send the first BA corresponding to the first BAR to the primary sending terminal, the secondary sending terminal may also obtain the first BA sent by the primary sending terminal through the shared channel and may obtain the sequence indication according to the first BA.

S407. the secondary sending terminal respectively sends the second BAR corresponding to the second data to each second receiving terminal according to the sequence indication, wherein the second BAR carries the sequence indication.

After the secondary sending terminal obtains the sequence indication carried in the first BA, the secondary sending terminal may send the second BAR corresponding to the second data to each second receiving terminal according to the sequence indication respectively and sequentially, wherein the second BAR carries the sequence indication.

S408. each second receiving terminal respectively generates the corresponding second BA according to the receiving condition thereof on the second data.

After each second receiving terminal receives the second data, each second receiving terminal respectively generates the corresponding second BA according to the receiving condition thereof on the second data.

In the present invention, the execution sequence of S407 and S408 is not limited. Namely, in the present invention, S407 may be executed before S408, S408 may be executed before S407, or S407 and S408 may also be simultaneously executed.

S409. each second receiving terminal respectively sends the second BA corresponding to the second BAR to the secondary sending terminal, wherein the second BA carries the sequence indication.

After each second receiving terminal generate the second BA, the second receiving terminals respectively send, if the second BAR requesting the second BA is received from the secondary sending terminal, the second BA corresponding to the second BAR to the secondary sending terminal, wherein the second BA carries the sequence indication, which may be used for indicating a secondary sending terminal not sending the second BAR to send the second BAR to each second receiving terminal it associates with.

It should be noted that, after sending the second BAR, the secondary sending terminal starts to receive the second BA after the first preset time.

Further, the first preset time provided by the embodiment of the present invention starts to be calculated after the sending terminal sends the BAR. Namely, for the primary sending terminal, the above-mentioned first preset time starts to be calculated after the primary sending terminal sends the first BAR; and for the secondary sending terminal, the first preset time starts to be calculated after the secondary sending terminal sends the second BAR.

As shown in FIG. 10, it is a schematic diagram of error recovery in coordinated beamforming/interference alignment of multiple sending terminals. The multiple sending terminals simultaneously send data of each receiving terminal respectively to each receiving terminal it associates with and corresponds to. Then the primary sending terminal sends the BAR of each first receiving terminal it associates with to each first receiving terminal at first, and thereby each first receiving terminal then respectively send back the first BA indicating a receiving condition of data thereof to the primary sending terminal. Then each secondary sending terminal sequentially send, according to the preset sequence indication, the second BAR of each second receiving terminal it associates with to each second receiving terminal it corresponds to respectively, and thereby the second receiving terminal then respectively send back the second BA indicating a receiving condition of data thereof to a corresponding secondary sending terminal.

S410. if the second BA indicates that the second data is correctly received by each second receiving terminal, the secondary sending terminal clears the second data cached in the secondary sending terminal. Alternatively, if the second BA indicates that the second data is not correctly received by each second receiving terminal, the secondary sending terminal respectively retransmits second data which is not correctly received, and clears correctly received second data cached in the secondary sending terminal.

After the secondary sending terminal receives the second BA, the secondary sending terminal learns the receiving conditions of each second receiving terminal on the second data according to the second BA, namely the receiving of the second data of each second receiving terminal succeeds or fails. If the second BA indicates that the second data is correctly received by each second receiving terminal, the secondary sending terminal clears the data cached in the secondary sending terminal. On the contrary, if the second BA indicates that the second data is not correctly received by each second receiving terminal, the secondary sending terminal respectively retransmits the second data which is not correctly received by each second receiving terminal and clears the second data which is correctly received by each second receiving terminal and cached in the secondary sending terminal, so as to guarantee the reliability of the transmission of the second data.

That the second data is not correctly received by each second receiving terminal, which is mentioned above, may include: none of each second receiving terminal correctly receive the second data sent by the secondary sending terminal; or a part of the second receiving terminals correctly receive the data sent by the secondary sending terminal, but a part of the second receiving terminals do not correctly receive the second data sent by the secondary sending terminal. In particular, the condition that a certain second receiving terminal does not correctly receive the second data may include: the second receiving terminal does not correctly receive all of the second data it corresponds to, or the second receiving terminal does not correctly receive a part of the second data it corresponds to.

In the embodiment of the present invention, the secondary sending terminal retransmits the second data which is correctly received by each second receiving terminal, namely performs error recovery of the second data, to guarantee the reliability of the transmission of the second data.

It should be noted that, in the another communication method for multiple access points provided by the embodiment of the present invention, at first, the primary sending terminal sends the first BAR to each first receiving terminal to request the receiving condition of each first receiving terminal on the first data. After each first receiving terminal respectively send back the first BA, a secondary sending terminal may sequentially send, according to the sequence indication in the first BA, the second BAR to each second receiving terminal to request the receiving condition of each second receiving terminal on the second data, until all the sending terminals at least request receiving terminals it associates with for one time.

S411. after the primary sending terminal respectively sends the first BAR to each first receiving terminal, if the primary sending terminal does not receive the first BA corresponding to the first BAR after a preset time, the primary sending terminal resends the first BAR to first receiving terminals not sending back the first BA.

After the primary sending terminal sends the first BAR, the primary sending terminal resends, if the primary sending terminal does not receive the first BA corresponding to the first BAR after the preset time, the first BAR to first receiving terminals not sending back the first BA.

It should be noted that, the preset time is PIFS, and PIFS is larger than SIFS, wherein the PIFS provided by the embodiment of the present invention may be defined as SIFS+slot time.

Optionally, after the primary sending terminal receives the first BA sent by each first receiving terminal respectively, the primary sending terminal sends, if the first BA indicates that the first data is not correctly received by each first receiving terminal, a first data indication to each first receiving terminal not correctly receiving the first data, wherein the first data indication may be used for indicating the first data which is not correctly received by each first receiving terminal.

Optionally, the first data indication may be sent by being carried in the first BAR, and it may also be sent by being carried in other messages, which is not limited in the present invention.

Further, the above-mentioned preset time, which is similar to the first preset time, starts to be calculated after the sending terminal sends the BAR. The preset time in the above-mentioned S411 starts to be calculated after the primary sending terminal sends the first BAR.

S412. if the secondary sending terminal, after the secondary sending terminal respectively sending the second BAR to each second receiving terminal, does not receive the second BA corresponding to the second BAR after a preset time, the secondary sending terminal resends the second BAR to second receiving terminals not sending back the second BA.

If the secondary sending terminal, after the secondary sending terminal sending the second BAR, does not receive the second BA corresponding to the second BAR after a preset time, the secondary sending terminal resends the second BAR to second receiving terminals not sending back the second BA.

Optionally, after the secondary sending terminal receives the second BA sent by each second receiving terminal respectively, the secondary sending terminal sends, if the second BA indicates that the second data is not correctly received by each second receiving terminal, a second data indication to each second receiving terminal not correctly receiving the second data, wherein the second data indication may be used for indicating the second data which is not correctly received by each second receiving terminal.

Optionally, the second data indication may be sent by being carried in the second BAR, and it may also be sent by being carried in other messages, which is not limited in the present invention.

It should be noted that, since the channel is shared, when each second receiving terminal send the second BA, the primary sending terminal may also obtain the second BA sent by each second receiving terminal respectively. However, since the second BA and the sequence indication carried in the second BA are merely used for indicating other secondary sending terminals not sending the BAR to execute corresponding steps, a process of the primary sending terminal for receiving the second BA will not be described in detail in the embodiment of the present invention.

The another communication method for multiple access points provided by the embodiment of the present invention may support error recovery during simultaneous data transmission between multiple sending terminals and multiple receiving terminals, thereby guaranteeing the reliability of data transmission and improving the throughput of the system.

According to the another communication method for multiple access points provided by the embodiment of the present invention, after the primary sending terminal respectively sends the first data corresponding to each first receiving terminal to each first receiving terminal and meanwhile the secondary sending terminal respectively sends the second data corresponding to each second receiving terminal to each second receiving terminal, the primary sending terminal respectively sends the first BAR corresponding to the first data to each first receiving terminal at first and receives the first BA sent by each first receiving terminal respectively. If the first BA indicates that the first data is correctly received by each first receiving terminal, the primary sending terminal clears the first data cached in the primary sending terminal, or if the first BA indicates that the first data is not correctly received by each first receiving terminal, the primary sending terminal retransmits the first data which is not correctly received and clears the correctly received data cached in the primary sending terminal. After the secondary sending terminal obtains the first BA sent by each first receiving terminal through the shared channel respectively, the secondary sending terminal respectively sends the second BAR corresponding to the second data to each second receiving terminal according to the sequence indication carried in the first BA and receives the second BA corresponding to the second BAR, which is sent by each second receiving terminal respectively. If the second BA indicates that the second data is correctly received by each second receiving terminal, the secondary sending terminal clears the second data cached in the secondary sending terminal, or if the second BA indicates that the second data is not correctly received by each second receiving terminal, the secondary sending terminal respectively retransmits the second data which is not correctly received and clears the correctly received second data cached in the secondary sending terminal. By means of the solution, since the primary sending terminal can learn, according to the BA sent back by the each receiving terminal, data receiving condition of the each receiving terminal, retransmit the data which are not correctly received according to the indication of the BA and clear the correctly received data cached in the primary sending terminal when multiple sending terminals and multiple receiving terminals transmit data together, error recovery for data which fails to be received by the each receiving terminal is therefore performed, and thereby the reliability of data transmission is guaranteed and the throughput of system is improved.

Embodiment 3

Figure 11:
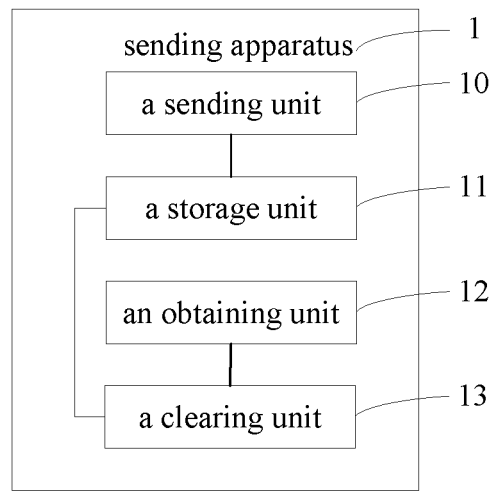
FIG. 11 is a first structural schematic diagram of a sending apparatus provided by an embodiment of the present invention.

As shown in FIG. 11, the embodiment of the present invention provides a sending apparatus 1. It is applied to a wireless communication system which obtains a channel based on a way of competition. The communication system includes a primary sending terminal, at least one sending apparatus 1 sharing a channel with the primary sending terminal and at least one receiving terminal. Corresponding to a communication method for multiple access points provided by an embodiment of the present invention, the sending apparatus 1 may include:

a sending unit 10, configured to send data to the each receiving terminal with the primary sending terminal simultaneously through a shared channel, and retransmit, when the each receiving terminal does not correctly receive the data, data which is not correctly received with the primary sending terminal simultaneously through the shared channel;

a storage unit 11, configured to cache the data;

an obtaining unit 12, configured to obtain a BA sent by the each receiving terminal through a shared channel respectively;

a clearing unit 13 configured to clear, if the BA indicates that the data is correctly received by the each receiving terminal respectively, the data cached in the storage unit 11, or clear, if the BA indicates that the data is not correctly received by the each receiving terminal, correctly received data cached in the storage unit 11.

Figure 12:
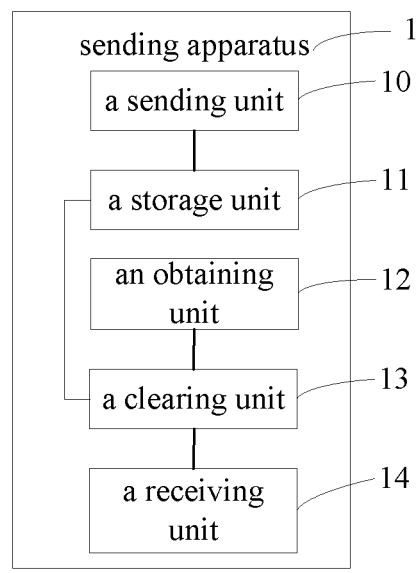
FIG. 12 is a second structural schematic diagram of a sending apparatus provided by an embodiment of the present invention.

Optionally, as shown in FIG. 12, the sending apparatus 1 further includes a receiving unit 14, and the receiving unit 14 is configured to receive, before the clearing unit 13 clears the correctly received data cached in the storage unit 11, a first indication sent by the primary sending terminal, wherein the first indication is used for indicating the data correctly received by the each receiving terminal, which is obtained by the primary sending terminal.

Optionally, the obtaining unit 12 is further configured to obtain a second indication according to the BA, wherein the second indication is used for indicating data correctly received by the each receiving terminal, which is obtained by the sending apparatus; and the clearing unit 13 is specifically configured to calculate a union set of the data indicated by the first indication and the data indicated by the second indication, and clear, according to a result of the union set calculation, data corresponding to the result, which is cached in the storage unit 11.

According to the sending apparatus provided by the embodiment of the present invention, after the sending apparatus sends the data corresponding to each receiving terminal to each receiving terminal, the sending apparatus obtains the BA sent by each receiving terminal through the shared channel respectively. If the BA indicates that the data is correctly received by each receiving terminal, the sending apparatus clears the data cached in the sending apparatus, or if the BA indicates that the data is not correctly received by each receiving terminal, the sending apparatus retransmits the data which is not correctly received and clears the correctly received data cached in the sending apparatus. By means of the solution, when the multiple sending terminals and the multiple receiving terminals transmit the data together, the sending apparatus may learn, according to the BA sent back by each receiving terminal, a receiving condition of the data of each receiving terminal, retransmit the data which is not correctly received according to the indication of the BA and clear the correctly received data cached in the sending apparatus, so as to perform error recovery on the data failing to be received by each receiving terminal, namely to initiate retransmission, thereby guaranteeing the reliability of data transmission and improving the throughput of the system.

Figure 13:
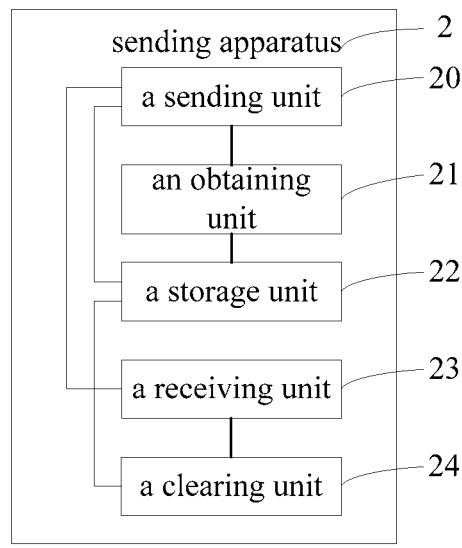
FIG. 13 is a third structural schematic diagram of a sending apparatus provided by an embodiment of the present invention.

As shown in FIG. 13, an embodiment of the present invention provides a sending apparatus 2. It is applied to a wireless communication system which obtains a channel based on a way of competition. The communication system includes a primary sending terminal, at least one sending apparatus 2 sharing a channel with the primary sending terminal, at least one first receiving terminal associated with the primary sending terminal and at least one second receiving terminal associated with the sending apparatus 2. Corresponding to another communication method for multiple access points provided by the embodiment of the present invention, the sending apparatus 2 may include:

a sending unit 20, configured to send second data corresponding to each second receiving terminal to the each second receiving terminal with the primary sending terminal synchronously through a shared channel;

an obtaining unit 21, configured to obtain a first block acknowledgement BA sent by the each first receiving terminal through the shared channel respectively, and obtain a preset sequence indication according to the first BA, wherein the first BA carries the sequence indication, the sequence indication is used for indicating a sequence of the sending apparatus 20 for sending a second block acknowledgement request BAR corresponding to the second data sent by the sending unit, and the second BAR carries the sequence indication;

the sending unit 20 is further configured to send, according to the sequence indication obtained by the obtaining unit 21, the second BAR to the each second receiving terminal respectively, and retransmit, when the each second receiving terminal does not correctly receive the second data, second data which is not correctly received respectively;

a storage unit 22, configured to cache the second data;

a receiving unit 23, configured to receive second BA sent by the each second receiving terminal respectively after the sending unit 20 respectively sends the second BAR, wherein the second BA carries the sequence indication;

a clearing unit 24, configured to clear, if the second BA received by the receiving unit 23 indicates that the second data is correctly received by the each second receiving terminal, the second data cached in the storage unit 22, or clear, if the second BA indicates that the second data is not correctly received by the each second receiving terminal, correctly received second data cached in the storage unit 22.

Optionally, the sending unit 20, after the sending unit 20 sends the second BAR corresponding to the second data to the each second receiving terminal respectively, is further configured to resend, if the receiving unit 23 does not receive the second BA corresponding to the second BAR after a preset time, the second BAR to a second receiving terminal which does not send back the second BA.

Optionally, the sending unit 20, after the receiving unit 23 receives the second BA sent by the each second receiving terminal respectively, is further configured to send, if the second BA indicates that the second data is not correctly received by the each second receiving terminal, a second data indication to a second receiving terminal which does not correctly receive the second data, wherein the second data indication is used for indicating the second data which is not correctly received by the each second receiving terminal.

According to the sending apparatus provided by the embodiment of the present invention, after the sending apparatus and the primary sending terminal synchronously send the second data corresponding to each second receiving terminal to each second receiving terminal, the sending apparatus obtains the first BA sent by each first receiving terminal through the shared channel respectively, and the sending apparatus sends the second BAR corresponding to the second data to each second receiving terminal according to the sequence indication carried in the first BA and receives the second BA corresponding to the second BAR and sent by each second receiving terminal respectively. If the second BA indicates that the second is correctly received by each second receiving terminal, the second data cached in the sending apparatus is cleared, and if the second BA indicates that the second data is not correctly received by each second receiving terminal, the second data which is not correctly received is retransmitted and the correctly received second data cached in the sending apparatus is cleared. By means of the solution, when the multiple sending terminals and the multiple receiving terminals transmit data together, the sending apparatus may learn, according to the BA sent back by each receiving terminal, the receiving condition of data of each receiving terminal, retransmit the data which is not correctly received according to the indication of the BA and clear the correctly received data cached in the sending apparatus, so as to perform error recovery on the data failing to be received by each receiving terminal, thereby guaranteeing the reliability of data transmission and improving the throughput of the system.

Embodiment 4

Figure 14:
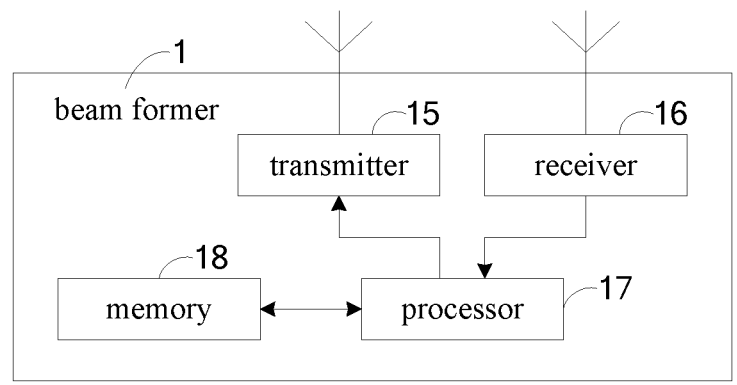
FIG. 14 is a first structural schematic diagram of a beam former provided by an embodiment of the present invention.

As shown in FIG. 14, an embodiment of the present invention provides a beam former 1. It is applied to a wireless communication system which obtains a channel based on a way of competition. The communication system includes a primary sending terminal, at least one beam former 1 sharing a channel with the primary sending terminal and at least one receiving terminal. Corresponding to the communication method for multiple access points provided by an embodiment of the present invention, the beam former 1 may include a transmitter 15, a receiver 16, a processor 17 and a memory 18.

The transmitter 15 may be configured to send data to other communication devices. Particularly, when the beam former communicates with other communication devices, the transmitter 15 may send communication data to the other communication devices.

The receiver 16 may be configured to receive data from the other communication devices. Particularly, when the beam former communicates with the other communication devices, the receiver 16 may receive the communication data from the other communication devices.

The processor 17 is a control and processing center of the beam former. The processor control, through operating a software program stored in the memory 18 and calling and processing data stored in the memory 18, the beam former to receive and send signals and achieve other functions of the beam former.

The memory 18 may be configured to store software program and data, for enabling the processor 17 to operate the software program stored in the memory 18 to enable the beam former to receive and send signals and achieve other functions of the beam former.

The beam former provided by the embodiment of the present invention may include a communication device in a wireless local area network such as a wireless router, wireless user equipment or the like.

Specifically, the transmitter 15 may be configured to simultaneously send data to each receiving terminal with the primary sending terminal through a shared channel, and simultaneously retransmit, when each receiving terminal does not correctly receive the data, the data which is not correctly received with the primary sending terminal through the shared channel. The receiver 16 may be configured to obtain BA sent by each receiving terminal through the shared channel respectively. The processor 17 may be configured to clear, if the BA indicates that the data is correctly received by each receiving terminal respectively, the data cached in the memory 18, or clear, if the BA indicates that the data is not correctly received by each receiving terminal, correctly received data cached in the memory 18. The memory 18 may be configured to store software codes of the data and software program for controlling the beam former to complete the above-mentioned steps, so as to enable the processor 17 to execute the above-mentioned software program and call the above-mentioned software codes to complete the above-mentioned steps.

Optionally, before the processor 17 clears the correctly received data cached in the memory 18, the receiver 16 is further configured to receive a first indication sent by the primary sending terminal, wherein the first indication is used for indicating the data correctly received by each receiving terminal which is obtained by the primary sending terminal.

Optionally, the processor 17 is further configured to obtain a second indication according to the BA, wherein the second indication is used for indicating the data correctly received by each receiving terminal which is obtained by the beam former. And the processor 17 is specifically configured to calculate a union set of the data indicated by the first indication and the data indicated by the second indication, and clear, according to a result of the union set calculation, the data corresponding to the result, which is cached in the memory 18.

There is provided a beam former by the embodiment of the present invention. After the beam former sends the data corresponding to each receiving terminal to each receiving terminal, the beam former obtains the BA sent by each receiving terminal through the shared channel respectively. If the BA indicates that the data is correctly received by each receiving terminal, the beam former clears the data cached in the beam former, or if the BA indicates that the data is not correctly received by each receiving terminal, the beam former retransmits the data which is not correctly received and clears the correctly received data cached in the beam former. By means of the solution, when multiple sending terminals and multiple receiving terminals transmit the data together, the beam former may learn, according to the BA sent back by each receiving terminal, a receiving condition of data of each receiving terminal, retransmit the data which is not correctly received according to the indication of the BA and clear the correctly received data cached in the beam former, so as to perform error recovery on the data failing to be received by each receiving terminal, namely to initiate retransmission, thereby guaranteeing the reliability of the data transmission and improving the throughput of the system.

Figure 15:
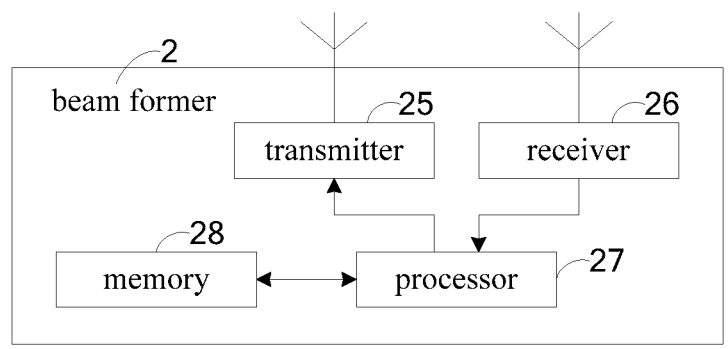
FIG. 15 is a second structural schematic diagram of a beam former provided by an embodiment of the present invention.

As shown in FIG. 15, an embodiment of the present invention provides a beam former 2. It is applied to a wireless communication system which obtains a channel based on a way of competition, the communication system includes a primary sending terminal, at least one beam former 2 sharing a channel with the primary sending terminal, at least one first receiving terminal associated with the primary sending terminal and at least one second receiving terminal associated with the beam former 2. Corresponding to another communication method for multiple access points provided by an embodiment of the present invention, the beam former 2 may include a transmitter 25, a receiver 26, a processor 27 and a memory 28.

The transmitter 25 may be configured to send data to other communication devices. Particularly, when the beam former communicates with other communication devices, the transmitter 25 may send communication data to the other communication devices.

The receiver 26 may be configured to receive data from the other communication devices. Particularly, when the beam former communicates with other communication devices, the receiver 26 may receive the communication data from the other communication devices.

The processor 27 is a control and processing center of the beam former, and is configured to control, through operating a software program stored in the memory 28 and calling and processing data stored in the memory 28, the beam former to receive and send signals and achieve other functions of the beam former.

The memory 28 may be configured to store the software program and the data, for enabling the processor 27 to operate the software program stored in the memory 28 to enable the beam former to receive and send signals and achieve the other functions of the beam former.

The beam former provided by the embodiment of the present invention may include a communication device in a wireless local area network such as a wireless router, wireless user equipment or the like.

Specifically, the transmitter 25 may be configured to synchronously send second data corresponding to each second receiving terminal to each second receiving terminal with the primary sending terminal through a shared channel. The receiver 26 may be configured to obtain first BA sent by each first receiving terminal through the shared channel respectively. The processor 27 may be configured to obtain a preset sequence indication according to the first BA, wherein the first BA carries the sequence indication. The sequence indication is used for indicating the sequence of the beam former for sending second BAR corresponding to the second data sent by the transmitter 25, and the second BAR carries the sequence indication. The transmitter 25 may be further configured to respectively send the second BAR to each second receiving terminal according to the sequence indication obtained by the processor 27, and respectively retransmit, when each second receiving terminal does not correctly receive the data, the second data which is not correctly received. The receiver 26 may be further configured to receive second BA sent by each second receiving terminal respectively after the transmitter 25 respectively sends the second BAR, wherein the second BA carries the sequence indication. The memory 28 may be configured to store software codes of the second data, software codes of the first BA, software codes of the second BAR, software codes of the second BA and a software program used for controlling the beam former to complete the above-mentioned steps, for enabling the processor 27 to complete the above-mentioned steps by executing the above-mentioned software program and calling the above-mentioned software codes.

Optionally, the transmitter 25 is further configured to resend, if the receiver 26 does not receive the second BA corresponding to the second BAR after a preset time, the second BAR to second receiving terminals not sending back the second BA after the transmitter 25 respectively sends the second BAR corresponding to the second data to each second receiving terminal.

Optionally, the transmitter 25 is further configured to send, if the second BA indicates that the second data is not correctly received by each second receiving terminal, a second data indication to each second receiving terminal not correctly receiving the second data after the receiver 26 receives the second BA sent by each second receiving terminal respectively, wherein the second data indication is used for indicating the second data which is not correctly received by each second receiving terminal.

There provided a beam former by the embodiment of the present invention. After the beam former and the primary sending terminal synchronously send the second data corresponding to each second receiving terminal to each second receiving terminal, the beam former obtains the first BA sent by each first receiving terminal through the shared channel respectively, and the beam former sends the second BAR corresponding to the second data to each second receiving terminal according to the sequence indication carried in the first BA and receives the second BA corresponding to the second BAR and sent by each second receiving terminal respectively. If the second BA indicates that the second data is correctly received by each second receiving terminal, the second data cached in the beam former is cleared, and if the second BA indicates that the second data is not correctly received by each second receiving terminal, the second data which is not correctly received is retransmitted and the correctly received second data cached in the beam former is cleared. By means of the solution, when the multiple sending terminals and the multiple receiving terminals transmit the data together, the beam former may learn, according to the BA sent back by each receiving terminal, a receiving condition of data of each receiving terminal, retransmit the data which is not correctly received according to the indication of the BA and clear the correctly received data cached in the beam former, so as to perform error recovery on the data failing to be received by each receiving terminal, thereby guaranteeing the reliability of data transmission and improving the throughput of the system.

Embodiment 5

Figure 16:
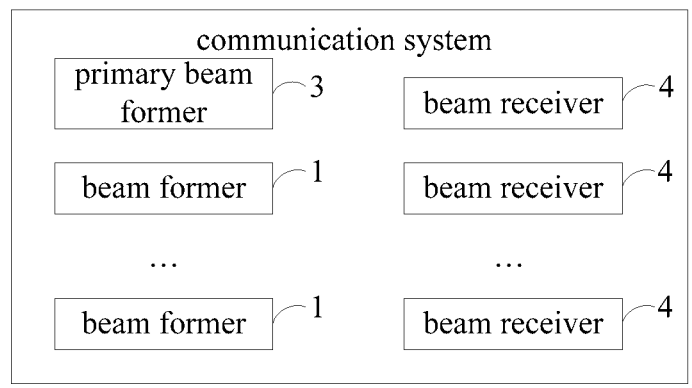
FIG. 16 is a first block diagram of a communication system provided by an embodiment of the present invention.

As shown in FIG. 16, an embodiment of the present invention provides a communication system. It is applied to a wireless communication scenario which obtains a channel based on a way of competition. The communication system may include a primary beam former 3, at least one beam former 1 and at least one beam receiver 4. It corresponds to a communication method for multiple access points provided by an embodiment of the present invention, wherein the primary beam former 3 corresponds to a primary sending terminal, the at least one beam former 1 respectively corresponds to at least one secondary sending terminal, and the at least one beam receiver 4 respectively corresponds to at least one receiving terminal.

Specifically, the primary beam former is configured to respectively send data corresponding to each beam receiver to each beam receiver; respectively send BAR corresponding to the data to each beam receiver; receive BA corresponding to the BAR which is sent by the beam receiver respectively; and if the BA indicates that the data is correctly received by each beam receiver, clear the data cached in the primary beam former, and if the BA indicates that the data is not correctly received by the beam receivers, retransmit data which is not correctly received, and clear correctly received data cached in the primary beam former.

The beam former is configured to simultaneously send the data to each beam receiver with the primary beam former through the shared channel.

The beam receiver is configured to receive the data sent by the primary beam former and the beam former; receive the BAR corresponding to the data, which is sent by the primary beam former; and send the BA corresponding to the BAR to the primary beam former.

Optionally, the beam former is further configured to obtain the BA sent by each beam receiver through the shared channel respectively; and if the BA indicates that the data is correctly received by each beam receiver respectively, clear the data cached in the beam former, or if the BA indicates that the data is not correctly received by each beam receiver, simultaneously retransmit the data which is not correctly received with the primary beam former through the shared channel, and clear the correctly received data cached in the beam former.

Optionally, after respectively sending the BAR corresponding to the data to each beam receiver, the primary beam former is further configured to resend, if not receiving the BA corresponding to the BAR after a preset time, the BAR to beam receivers not sending back the BA.

Optionally, after receiving the BA sent by each beam receiver respectively, the primary beam former is further configured to send, if the BA indicates that the data is not correctly received by each beam receiver, a data indication to each beam receiver not correctly receiving the data, wherein the data indication is used for indicating the data which is not correctly received by each beam receiver.

Optionally, there are more than two beam receivers, and the primary beam former is specifically configured to respectively send the BAR to each beam receiver according to a preset sequence, wherein the preset sequence is that sending the BAR to each beam receiver belonging to a same BSS as the primary beam former at first and then sending the BAR to each beam receiver not belonging to the same BSS as the primary beam former.

Optionally, the primary beam former is specifically configured to: obtain a first indication according to the BA, wherein the first indication is used for indicating the data correctly received by each beam receiver, which is obtained by the primary beam former; and clear, according to the first indication, the data corresponding to the first indication, which is cached in the primary beam former.

Optionally, the primary beam former is further configured to send the first indication to the beam former.

Optionally, before clearing the correctly received data cached in the beam former according to the BA, the beam former is further configured to receive the first indication sent by the primary beam former.

Optionally, the beam former is specifically configured to: obtain a second indication according to the BA, wherein the second indication is used for indicating the data correctly received by each beam receiver, which is obtained by the beam former; calculate a union set of the data indicated by the first indication and the data indicated by the second indication; clear, according to a result of union set calculation, the data corresponding to the result and cached in the beam former.

There is provided a communication system by an embodiment of the present invention. After the primary beam former and the beam former simultaneously send the data corresponding to each beam receiver to each beam receivers through the shared channel respectively, the primary beam former respectively sends the BAR corresponding to the data to each beam receiver. Moreover, the primary beam former and the beam former obtain the BA corresponding to the BAR and sent by each beam receiver respectively. If the BA indicates that the data is correctly received by each beam receiver, the primary beam former and the beam former clear the data cached therein respectively, and if the BA indicates that the data is not correctly received by each beam receiver, the primary beam former and the beam former retransmit the data which is not correctly received and respectively clear the correctly received data cached therein. By means of the solution, when multiple beam formers and multiple beam receivers transmit the data together, the multiple beam formers may learn, according to the BA sent back by each beam receiver, a receiving condition of data of each beam receiver, retransmit the data which is not correctly received according to the indication of the BA and clear the correctly received data cached therein respectively, so as to perform error recovery on the data failing to be received by the beam receivers, namely to initiate retransmission, thereby guaranteeing the reliability of data transmission and improving the throughput of the system.

Figure 17:
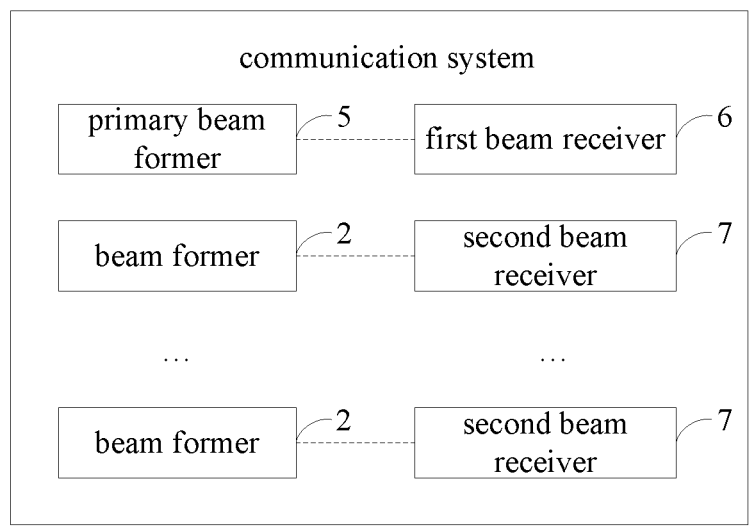
FIG. 17 is a second block diagram of a communication system provided by an embodiment of the present invention.

As shown in FIG. 17, an embodiment of the present invention further provides another communication system. It is applied to a wireless communication scenario which obtains a channel based on a way of competition. The communication system may include a primary beam former 5, at least one beam former 2, at least one first beam receiver 6 associated with the primary beam former 5 and at least one second beam receiver 7 associated with the at least one beam former 2. It corresponds to the another communication method for multiple access points provided by an embodiment of the present invention, wherein the primary beam former 5 corresponds to a primary sending terminal, the at least one beam former 2 respectively corresponds to at least one secondary sending terminal, the at least one first beam receiver 6 respectively corresponds to at least one first receiving terminal, and the at least one second beam receiver 7 respectively corresponds to at least one second receiving terminal.

Specifically, the primary beam former is configured to: respectively send first data corresponding to each first beam receiver to each first beam receiver; respectively send first BAR corresponding to the first data to each first beam receiver; receive first BA corresponding to the first BAR and sent by each first beam receiver respectively; and if the first BA indicates that the first data is correctly received by each first beam receiver, clear the first data cached in the primary beam former, or if the first BA indicates that the first data is not correctly received by each first beam receiver, respectively retransmit the first data which is not correctly received, and clear the correctly received first data cached in the primary beam former, wherein the first BAR and the first BA carry a preset sequence indication, the sequence indication is used for indicating a sequence of the beam former for sending second BAR corresponding to second data, and the second BAR carries the sequence indication.

The beam former is configured to: synchronously send the second data corresponding to each second beam receiver to each second beam receiver with the primary beam former through a shared channel; obtain the first BA sent by each first beam receiver through the shared channel respectively, and obtain the sequence indication according to the first BA; sequentially send the second BAR to each second beam receiver according to the sequence indication respectively; receive second BA corresponding to the second BAR, which is sent by each second beam receiver respectively, wherein the second BA carries the sequence indication; and if the second BA indicates that the second data is correctly received by each second beam receiver, clear the second data cached in the beam former, or if the second BA indicates that the second data is not correctly received by each second beam receiver, respectively retransmit the second data which is not correctly received, and clear the correctly received second data cached in the beam former.

The first beam receiver is configured to: receive the first data and the first BAR sent by the primary beam former; and send the first BA corresponding to the first BAR to the primary beam former.

The second beam receiver is configured to: receive the second data and the second BAR sent by the beam former; and send the second BA corresponding to the second BAR to the beam former.

Optionally, after respectively sending the first BAR corresponding to the first data to each first beam receiver, the primary beam former is further configured to resend, if not receiving the first BA corresponding to the first BAR after a preset time, the first BAR to first beam receivers not sending back the first BA.

Optionally, after receiving the first BA sent by each first beam receiver respectively, the primary beam former is further configured to send, if the first BA indicates that the first data is not correctly received by each first beam receiver, a first data indication to each first beam receiver not correctly receiving the first data, wherein the first data indication is used for indicating the first data which is not correctly received by each first beam receiver.

Optionally, after respectively sending the second BAR corresponding to the second data to each second beam receiver respectively, the beam former is further configured to resend, if not receiving the second BA corresponding to the second BAR after the preset time, the second BAR to each second beam receiver not sending back the second BA.

Optionally, after receiving the second BA sent by each second beam receiver respectively, the beam former is further configured to send, if the second BA indicates that the second data is not correctly received by each second beam receiver, a second data indication to each second beam receiver not correctly receiving the second data, wherein the second data indication is used for indicating the second data which is not correctly received by each second beam receiver.

Optionally, there are more than two beam formers, and the sequence indication indicates that the beam formers belonging to the same BSS as the primary beam former performs sending at first, and then the beam formers not belonging to the same BSS as the primary beam former performs sending, the sequence indication includes an identifier of the primary beam former and an identifier of the beam former, wherein the identifier of the primary beam former includes an MAC address or an AID of the primary beam former, and the identifier of the beam former respectively include an MAC address or AID of each beam former.

Optionally, there are more than two first beam receivers and more than two second beam receivers. The sequence indication further includes an identifier of each first beam receiver, for indicating the sequence of each first beam receiver for sending the first BA respectively. The sequence indication further includes an identifier of each second beam receiver, for indicating the sequence of each second beam receiver for sending the second BA respectively, wherein the identifier of each first beam receiver respectively include the MAC addresses or AIDs of each first beam receiver, and the identifier of each second receiving terminal respectively include the MAC address or AID of the each second beam receiver.

There is provided another communication system by the embodiment of the present invention. After the primary beam former respectively sends the first data corresponding to each first beam receiver to each first beam receiver, and meanwhile the beam former respectively sends the second data corresponding to each second beam receiver to each second beam receiver, the primary beam former respectively sends first BAR corresponding to the first data to each first beam receiver at first and receives the first BA sent by each first beam receiver respectively. If the first BA indicates that the first data are correctly received by each first beam receiver, the primary beam former clears the first data cached in the primary beam former, or if the first BA indicates that the first data is not correctly received by each first beam receiver. The primary beam former retransmits the first data which is not correctly received and clears the correctly received first data cached in the primary beam former. After the beam former obtains the first BA sent by each first beam receiver through the shared channel respectively, the beam former respectively sends second BAR corresponding to the second data to each second beam receiver according to the sequence indication carried in the first BA, and receives the second BA corresponding to the second BAR and sent by each second beam receiver respectively. Then, if the second BA indicates that the second data is correctly received by each second beam receiver, the beam former clears the second data cached in the beam former, or if the second BA indicates that the second data is not correctly received by the second beam receiver, the beam former respectively retransmits the second data which is not correctly received and clears the correctly received second data cached in the beam former. By means of the solution, when multiple beam formers and multiple beam receivers transmit the data together, the multiple beam formers may learn, according to the BA sent back by each beam receiver it associates with respectively, a receiving condition of data of each beam receiver, retransmit the data which is not correctly received according to the indication of the BA and clear the correctly received data cached therein respectively, so as to perform error recovery on the data failing to be received by each beam receiver, namely to initiate retransmission, thereby guaranteeing the reliability of data transmission and improving the throughput of the system.

Those skilled in the art to which the present invention pertains may clearly understand that, for convenience and simplicity of description, an illustration is merely given on the division of the above-mentioned functional modules, in practical application, the above-mentioned functions may be allocated to different functional modules according to demands for execution, namely the internal structure of the apparatus is divided into different functional modules to complete all or a part of functions described above. The specific working processes of the system, the apparatus and the units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the modules or units is only a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection of apparatuses or units through some interfaces, and may be in electrical, mechanical or other forms.

The units described as separate components may be separated physically or not, components displayed as units may be physical units or not, namely, may be located in one place, or may also be distributed on a plurality of network units. A part of or all of the units may be selected to implement the purposes of the solutions in the embodiments according to actual demand.

In addition, the functional units in the embodiments of the present invention may be integrated in a processing unit, or the units singly exist physically, or two or more units are integrated in one unit. The above-mentioned integrated unit may be both implemented in a hardware form and may also be implemented in the form of a software functional unit.

If the integrated unit is implemented in the form of the software functional unit and is sold or used as an independent product, it may be stored in a computer readable storage medium. Based on this understanding, the technical solutions of the present invention substantially, or the part contributing to the prior art, or all or a part of the technical solutions may be implemented in the form of a software product, the computer software product is stored in a storage medium, and includes a plurality of instructions enabling a computer device (may be a personnel computer, a server, or a network device or the like) or a processor (processor) to execute all or a part of the steps of the methods in the embodiments of the present invention. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific implementations of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:
1. A communication system, comprising a primary sending terminal, at least one secondary sending terminal sharing a channel with the primary sending terminal and at least one receiving terminal, wherein,
the primary sending terminal is configured to:
send data corresponding to the at least one receiving terminal to the at least one receiving terminal;
send a block acknowledgement request (BAR) corresponding to the data to the at least one receiving terminal;
receive a block acknowledgement (BA) corresponding to the BAR, which is sent by the at least one receiving terminal; and
clear the data cached in the primary sending terminal, when the BA indicates that the data is correctly received by the at least one receiving terminal;
the secondary sending terminal is configured to:
send the data to the at least one receiving terminal with the primary sending terminal simultaneously through a shared channel;
obtain the BA sent by the receiving terminal through the shared channel; and
clear the data cached in the secondary sending terminal, when the BA indicates that the data is correctly received by the receiving terminal; and
the receiving terminal is configured to:
receive the data sent by the primary sending terminal and the secondary sending terminal;
receive the BAR corresponding to the data, which is sent by the primary sending terminal; and
send the BA corresponding to the BAR to the primary sending terminal,
wherein there are more than two receiving terminals,
the primary sending terminal is specifically configured to send, according to a preset sequence, the BAR to the receiving terminals, wherein the preset sequence indicates that the BAR is sent to each receiving terminal belonging to a same basic service set BSS as the primary sending terminal at first, and then the BAR is sent to each receiving terminal not belonging to the same BSS as the primary sending terminal,
wherein the primary sending terminal and the at least one secondary sending terminal share the data sent to the at least one receiving terminal and channel information necessary for sending the data.
2. The communication system of claim 1, wherein,
the secondary sending terminal is further configured to:
if the BA indicates that the data is not correctly received by the at least one receiving terminal, retransmit data which is not correctly received with the primary sending terminal simultaneously through the shared channel respectively, and clear correctly received data cached in the secondary sending terminal.
3. The communication system of claim 1, wherein,
the primary sending terminal, after sending the BAR corresponding to the data to the at least one receiving terminal, is further configured to resend, if not receiving a BA corresponding to the BAR after a preset time, the BAR to a receiving terminal which does not send the BA back.
4. The communication system of claim 1, wherein,
the primary sending terminal, after receiving the BA sent by the at least one receiving terminal, is further configured to send, if the BA indicates that the data is not correctly received by the at least one receiving terminal, a data indication to each receiving terminal which does not correctly receive the data, wherein the data indication is used for indicating the data which is not correctly received by the at least one receiving terminal.
5. A communication system, comprising a primary sending terminal, at least one secondary sending terminal sharing a channel with the primary sending terminal and at least one receiving terminal, wherein,
the primary sending terminal is configured to:
send data corresponding to the at least one receiving terminal to the at least one receiving terminal;
send a block acknowledgement request (BAR) corresponding to the data to the at least one receiving terminal;
receive a block acknowledgement (BA) corresponding to the BAR, which is sent by the at least one receiving terminal; and
clear the data cached in the primary sending terminal, when the BA indicates that the data is correctly received by the at least one receiving terminal;
the secondary sending terminal is configured to:
send the data to the at least one receiving terminal with the primary sending terminal simultaneously through a shared channel;
obtain the BA sent by the receiving terminal through the shared channel; and
clear the data cached in the secondary sending terminal, when the BA indicates that the data is correctly received by the receiving terminal; and the receiving terminal is configured to:
receive the data sent by the primary sending terminal and the secondary sending terminal;
receive the BAR corresponding to the data, which is sent by the primary sending terminal; and
send the BA corresponding to the BAR to the primary sending terminal,
wherein,
the primary sending terminal is specifically configured to:
obtain a first indication according to the BA, wherein the first indication is used for indicating the data correctly received by the at least one receiving terminal, which is obtained by the primary sending terminal; and
clear, according to the first indication, the data corresponding to the first indication, which is cached in the primary sending terminal,
wherein, the secondary sending terminal is further configured to receive, before clearing correctly received data cached in the secondary sending terminal according to the BA, the first indication sent by the primary sending terminal,
wherein, the secondary sending terminal is specifically configured to:
obtain a second indication according to the BA, wherein the second indication is used for indicating the data correctly received by the at least one receiving terminal, which is obtained by the secondary sending terminal;
calculate a union set of the data indicated by the first indication and the data indicated by the second indication; and
clear, according to a result of the union set calculation, data corresponding to the result, which is cached in the secondary sending terminal,
wherein the primary sending terminal and the at least one secondary sending terminal share the data sent to the at least one receiving terminal and channel information necessary for sending the data.

6. A sending apparatus, applied to a wireless communication system which obtains a channel based on a way of competition, the communication system comprising a primary sending terminal, at least one sending apparatus sharing a channel with the primary sending terminal and at least one receiving terminal, wherein the sending apparatus comprises:
a non-transitory computer readable storage medium;
a transceiver; and
a processor;
wherein the non-transitory computer readable storage medium comprises computer executable instructions, and when the instructions are executed:
the transceiver is configured to send data to the at least one receiving terminal through a shared channel, wherein the data is sent from the primary sending terminal to the receiving terminal through the shared channel simultaneously; retransmit, when the at least one receiving terminal does not correctly receive the data, data which is not correctly received with the primary sending terminal simultaneously through the shared channel;
the processor is configured to cache the data in a storage;
obtain a block acknowledgement (BA) sent by the at least one receiving terminal through a shared channel, wherein the BA is sent in response to a block acknowledgement request (BAR) sent by the primary sending terminal; and clear, if the BA indicates that the data is correctly received by the at least one receiving terminal, the data cached in the storage,
wherein the transceiver is further configured to receive, before the processor clears the correctly received data cached in the storage, a first indication sent by the primary sending terminal, wherein the first indication is used for indicating the data correctly received by the at least one receiving terminal, which is obtained by the primary sending terminal,
wherein, the transceiver is further configured to obtain a second indication according to the BA, wherein the second indication is used for indicating data correctly received by the at least one receiving terminal, which is obtained by the sending apparatus; and
the processor is specifically configured to calculate a union set of the data indicated by the first indication and the data indicated by the second indication, and clear, according to a result of the union set calculation, data corresponding to the result, which is cached in the storage,
wherein the primary sending terminal and the at least one sending apparatus share the data sent to the at least one receiving terminal and channel information necessary for sending the data.

7. The sending apparatus of claim 6, wherein the processor is further configured to clear, if the BA indicates that the data is not correctly received by the at least one receiving terminal, correctly received data cached in the storage.

8. A communication method, applied to a wireless communication system which obtains a channel based on a way of competition, the communication system comprising a primary sending terminal, at least one secondary sending terminal sharing a channel with the primary sending terminal and at least one receiving terminal, wherein the method comprises:
sending, by the secondary sending terminal, data to the at least one receiving terminal through a shared channel, wherein the data is sent from the primary sending terminal to the receiving terminal through the shared channel simultaneously;
obtaining, by the secondary sending terminal, a block acknowledgement (BA) sent by the at least one receiving terminal through the shared channel, wherein the BA is sent in response to a block acknowledgement request (BAR) sent by the primary sending terminal; and
if the BA indicates that the data is correctly received by the at least one receiving terminal, clearing, by the secondary sending terminal, the data cached in the secondary sending terminal,
wherein before the clearing, by the secondary sending terminal, the data cached in the secondary sending terminal, the method further comprises:
receiving, by the secondary sending terminal, a first indication sent by the primary sending terminal, wherein the first indication is used for indicating the data correctly received by the at least one receiving terminal, which is obtained by the primary sending terminal,
wherein the clearing, by the secondary sending terminal, the data cached in the secondary sending terminal specifically comprises:
obtaining, by the secondary sending terminal, a second indication according to the BA, wherein the second indication is used for indicating data correctly received by the at least one receiving terminal, which is obtained by the sending apparatus;

calculating, by the secondary sending terminal, a union set of the data indicated by the first indication and the data indicated by the second indication; and clearing, by the secondary sending terminal according to a result of the union set calculation, the data corresponding to the result, which is cached in the secondary sending terminal, wherein the primary sending terminal and the at least one secondary sending terminal share the data sent to the at least one receiving terminal and channel information necessary for sending the data.

9. The communication method of claim 8, the method further comprising:

if the BA indicates that the data is not correctly received by the at least one receiving terminal, retransmitting, by the secondary sending terminal, data which is not correctly received with the primary sending terminal simultaneously through the shared channel, and clearing, by the secondary sending terminal, correctly received data cached in the secondary sending terminal.

10. The communication system of claim 1, wherein, the primary sending terminal is further configured to:

retransmit data which is not correctly received and clear correctly received data cached in the primary sending terminal, when the BA indicates that the data is not correctly received by the each receiving terminal.

11. The communication system of claim 5, wherein, the secondary sending terminal is further configured to:

if the BA indicates that the data is not correctly received by the at least one receiving terminal, retransmit data which is not correctly received with the primary sending terminal simultaneously through the shared channel respectively, and clear correctly received data cached in the secondary sending terminal.

12. The communication system of claim 5, wherein, the primary sending terminal, after sending the BAR corresponding to the data to the at least one receiving terminal, is further configured to resend, if not receiving a BA corresponding to the BAR after a preset time, the BAR to a receiving terminal which does not send the BA back.

13. The communication system of claim 5, wherein, the primary sending terminal, after receiving the BA sent by the at least one receiving terminal, is further configured to send, if the BA indicates that the data is not correctly received by the at least one receiving terminal, a data indication to each receiving terminal which does not correctly receive the data, wherein the data indication is used for indicating the data which is not correctly received by the at least one receiving terminal.

* * * * *